United States Patent
Osako

(10) Patent No.: US 9,256,797 B2
(45) Date of Patent: Feb. 9, 2016

(54) STORAGE MEDIUM HAVING IMAGE RECOGNITION PROGRAM STORED THEREIN, IMAGE RECOGNITION APPARATUS, IMAGE RECOGNITION SYSTEM, AND IMAGE RECOGNITION METHOD

(75) Inventor: Satoru Osako, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 437 days.

(21) Appl. No.: 12/914,037

(22) Filed: Oct. 28, 2010

(65) Prior Publication Data
US 2011/0305367 A1 Dec. 15, 2011

(30) Foreign Application Priority Data

Jun. 11, 2010 (JP) .................................. 2010-133510
Jun. 21, 2010 (JP) .................................. 2010-140354

(51) Int. Cl.
*G06K 9/00* (2006.01)
*G06K 9/32* (2006.01)
*G06T 7/00* (2006.01)

(52) U.S. Cl.
CPC ............ *G06K 9/3216* (2013.01); *G06T 7/0044* (2013.01); *A63F 2300/204* (2013.01); *A63F 2300/69* (2013.01); *G06T 2207/30204* (2013.01)

(58) Field of Classification Search
None
See application file for complete search history.

(56) References Cited

U.S. PATENT DOCUMENTS

| 5,754,692 | A * | 5/1998 | Kondo et al. ................. 382/216 |
| 5,951,056 | A | 9/1999 | Fukuda et al. |
| 6,330,356 | B1 | 12/2001 | Sundareswaran et al. |
| 6,724,930 | B1 | 4/2004 | Kosaka et al. |
| 7,194,114 | B2 * | 3/2007 | Schneiderman ............. 382/118 |
| 7,515,756 | B2 * | 4/2009 | Hashimoto ................... 382/224 |
| 7,733,409 | B2 * | 6/2010 | Fleury et al. ................. 348/340 |
| 7,991,880 | B2 * | 8/2011 | Balandin et al. ............. 709/224 |
| 8,009,879 | B2 * | 8/2011 | Iwai et al. ..................... 382/118 |
| 8,216,036 | B2 * | 7/2012 | Eyzaguirre et al. ............... 463/2 |
| 2002/0158873 | A1 * | 10/2002 | Williamson .................. 345/427 |
| 2003/0076980 | A1 | 4/2003 | Zhang et al. |
| 2005/0069174 | A1 | 3/2005 | Uchiyama et al. |
| 2006/0027657 | A1 * | 2/2006 | Ninnink et al. ............... 235/454 |

(Continued)

FOREIGN PATENT DOCUMENTS

| EP | 0717398 | 6/1996 |
| EP | 2093697 | 8/2009 |

(Continued)

OTHER PUBLICATIONS

Kato, H. et al. "Virtual Object Manipulation on a Table-Top AR Environment," 2000, Proceedings. IEEE and ACM International Symposium on Augmented Reality, pertinent pp. 11-119, 10 pages total.*

(Continued)

*Primary Examiner* — Sumati Lefkowitz
*Assistant Examiner* — Ryan P Potts
(74) *Attorney, Agent, or Firm* — Nixon & Vanderhye P.C.

(57) ABSTRACT

A game apparatus obtains a captured image captured by a camera. First, the game apparatus detects an object area of the captured image that includes a predetermined image object based on pixel values obtained at a first pitch across the captured image. Then, the game apparatus detects a predetermined image object from an image of the object area based on pixel values obtained at a second pitch smaller than the first pitch across the object area of the captured image.

23 Claims, 19 Drawing Sheets

(56) References Cited

U.S. PATENT DOCUMENTS

| | | | |
|---|---|---|---|
| 2006/0038833 A1* | 2/2006 | Mallinson et al. | 345/633 |
| 2007/0038944 A1 | 2/2007 | Carignano et al. | |
| 2007/0102520 A1* | 5/2007 | Carlson et al. | 235/454 |
| 2007/0273644 A1 | 11/2007 | Natucci | |
| 2008/0266323 A1* | 10/2008 | Biocca et al. | 345/633 |
| 2009/0195538 A1* | 8/2009 | Ryu et al. | 345/419 |
| 2010/0078478 A1 | 4/2010 | Ao et al. | |
| 2011/0159957 A1 | 6/2011 | Kawaguchi et al. | |

FOREIGN PATENT DOCUMENTS

| | | |
|---|---|---|
| JP | 1-289696 | 11/1989 |
| JP | H07-98208 | 4/1995 |
| JP | 2000-140435 | 5/2000 |
| JP | 2005-107247 | 4/2005 |
| JP | 2007-233971 | 9/2007 |
| JP | 2008-146109 | 6/2008 |
| JP | 2008-176357 | 7/2008 |
| JP | 2009-020614 | 1/2009 |
| JP | 2008-140047 | 6/2009 |
| JP | 2009-294048 | 12/2009 |
| WO | WO 2009106518 A1 * | 9/2009 |

OTHER PUBLICATIONS

May 23, 2012 Office Action (20 pages) from U.S. Appl. No. 12/869,311.

GE's Augmented Reality Ad (2 pages), http://www.youtube.com/watch?v=5fGav7F15P4, Apr. 16, 2009.

Oshima, "AR<SP>2</SP> Heckey System: A Collaborative Mixed Reality System," Transactions of the Virtual Reality Society of Japan, vol. 3, No. 2, 1998, pp. 55-60, and English translation thereof, 12 pages.

U.S. Appl. No. 12/869,311, filed Aug. 26, 2010.

U.S. Appl. No. 12/915,696, filed Oct. 29, 2010.

Tateno et al., "A Nested Marker for Augmented Reality" IEICE Technical Report of The Institute of Electronics, Information and Communication Engineers, Japan, vol. 106, No. 234 Sep. 5, 2006, pp. 19-24, and partial translation thereof, 6 pages.

Kato et al., "An Augmented Reality System and its Calibration based on Marker Tracking", Journal of Virtual Reality Society of Japan, vol. 4, No. 4, 1999, 10 pages, with a partial English translation (2 pages).

Kato et al., "Marker Tracking and HMD Calibration for a Video-based Augmented Reality Conferencing System," Proceedings of IWAR99 (the $2^{nd}$ International Workshop on Augmented Reality), Oct. 1999, 10 pages.

Kato et al., "An Augmented Reality System and its Calibration based on Marker Tracking", Journal of Virtual Reality Society of Japan, vol. 4, No. 4, 1999, 10 pages, with a partial English translation.

Kato et al., "Marker Tracking and HMD Calibration for a Video-based Augmented Reality Conferencing System," Proceedings of IWAR99 (the $2^{nd}$ International Workshop on Augmented Reality), Oct. 1999, 9 pages.

Tateno et al. "A Nested Marker for Augmented Reality", IEEE Virtual Reality Conference, pp. 259-262, Mar. 10-14, 2007.

Office Action for U.S. Appl. No. 12/915,696, mailed Mar. 29, 2013.

Final Office Action for U.S. Appl. No. 12/915,696, mailed Sep. 17, 2013.

Hoff et al. "Computer-vision-based Registration Techniques for Augmented Reality" Proceedings of SPIE 2904, Intelligent Robots and Computer Vision XV: Algorithms, Techniques, Active Vision, and Materials Handling, Oct. 29, 1996, pp. 538-548.

Notice of Allowance for U.S. Appl. No. 12/915,696, mailed Jan. 6, 2014.

LG Augmented Reality Retail Experience Uploaded by Timmersion07, uploaded Mar. 19, 2010, http://www.youtube.com/watch?v=yA7pShrgoPw.

Mar. 21, 2014 Office Action for U.S. Appl. No. 12/869,311, 28 pages.

Extended European Search Report for European Patent Application No. 10188871.7, mailed Feb. 24, 2014, eight pages.

* cited by examiner

STORAGE MEDIUM HAVING IMAGE RECOGNITION PROGRAM STORED THEREIN, IMAGE RECOGNITION APPARATUS, IMAGE RECOGNITION SYSTEM, AND IMAGE RECOGNITION METHOD

CROSS REFERENCE TO RELATED APPLICATION

The disclosure of Japanese Patent Application No. 2010-133510, filed on Jun. 11, 2010 and Japanese Patent Application No. 2010-140354, filed on Jun. 21, 2010 is incorporated herein by reference.

BACKGROUND OF THE INVENTION

1. Field of the Invention

The present invention relates to a storage medium having stored therein an image recognition program for recognizing a predetermined image object from an image captured by an image-capturing section, an image recognition apparatus, an image recognition system, and an image recognition method.

2. Description of the Background Art

There are conventional techniques for detecting a predetermined image object from an image (captured image) captured by an image-capturing section such as a camera. For example, Non-Patent Document 1 (Hirokazu Kato, Mark Billinghurst, Koichi Asano, Keihachiro Tachibana, "An Augmented Reality System and its Calibration based on Marker Tracking", Journal of Virtual Reality Society of Japan, Vol. 4, No. 4, 1999) describes performing an image recognition process on a marker included in an image captured by a camera in an augmented reality technique. In Non-Patent Document 1, connected regions are extracted by binarizing the captured image using a fixed threshold value, and those of the connected regions with an appropriate size and shape are selected as marker candidates, which are subjected to pattern matching so as to detect a marker.

With the recognition method described in Non-Patent Document 1, the image recognition process is performed by pixels of the captured image as input. Therefore, when the input image has a high resolution (high definition), the amount of time required for the image recognition process is increased. On the other hand, if the image recognition process is simply performed with a lower precision (at coarser pixel pitches) than the pixel pitch of the input captured image, the marker detection precision is lowered.

SUMMARY OF THE INVENTION

It is therefore an object of the present invention to provide a storage medium having stored therein an image recognition program capable of shortening the amount of time required for detection while maintaining the object detection precision, an image recognition apparatus, an image recognition system, and an image recognition method.

The present invention employs configurations (1) to (14) below to solve the problems mentioned above.

(1)

The present invention is directed to a computer-readable storage medium having stored therein an image recognition program to be executed by a computer of an information processing apparatus for detecting a predetermined image object included in a captured image captured by an image-capturing section. The image recognition program instructs the computer to function as: an image obtaining section, an area detection section, and an object detection section. The image obtaining section obtains the captured image captured by the image-capturing section. The area detection section detects an object area of the captured image that includes the predetermined image object based on pixel values obtained at a first pitch across the captured image. The object detection section detects the predetermined image object from an image of the object area based on pixel values obtained at a second pitch smaller than the first pitch across the object area of the captured image.

The "image-capturing section" may be built in the information processing apparatus, or may be a separate unit from the information processing apparatus. Where the image-capturing section is built in the information processing section, the image-capturing section may be fixedly attached to, or detachable from, the information processing apparatus. The image-capturing section may operate in cooperation with, or independently of, the operation of the information processing apparatus.

While the "predetermined image object" is a first graphic pattern 55 included in a marker 51 in the embodiment to be described later, it may be any object as long as it can be recognized by the recognition process. For example, the "predetermined image object" may be the face or a body part of the user (player).

The "information processing apparatus" is a concept encompassing any computers that process information by executing computer programs, as well as the game apparatus described in the embodiment to be described later. The "information processing apparatus" may or may not be of a portable type.

While the "image recognition program" is, for example, the game program described in the embodiment to be described later, it is a concept encompassing application programs to be executed by personal computers or portable terminals.

The "image obtaining section" may obtain a captured image from an image-capturing section provided in the information processing apparatus via an internal bus, or the like, may obtain a captured image from an image-capturing section provided outside the information processing apparatus via telecommunications, or may obtain a captured image from a storage medium storing therein a captured image captured by an image-capturing section when the storage medium is attached to the information processing apparatus.

The "pixel value" may be any information as long as it is a value representing the color, the luminance, etc., set for a pixel.

The "area detection section" may be any section as long as it detects an object area including a predetermined image object, and the specific method for detecting the object area may be any method.

The "second pitch" may be of any length as long as it is smaller than the "first pitch". Where a plurality of different processes are performed in the image object detecting process, as in the embodiment to be described later, it is only required that at least one of the processes is performed based on pixel values obtained at the second pitch.

The "object detection section" may be any section as long as it can detect a predetermined image object from an object area, and the specific method for detecting the predetermined image object may be any method.

To "detect a predetermined image object" is a concept encompassing to determine whether a predetermined image object is present within the captured image (to detect the presence of the predetermined image object), as well as to calculate the position (and/or direction) of the predetermined image object within the captured image as in the embodiment to be described later or the configuration (2) below. That is, the detection result of the object detection section may be information regarding the position and/or direction of the predetermined image object in the captured image, or may be information representing whether the image object is present within the captured image.

With the configuration (1) above, the area detection section detects the object area first with a low precision, and then the process of detecting the predetermined image object from the object area is performed with a high precision. Thus, the object area detection process is performed with a low precision and the range across which the process of detecting the predetermined image object is performed is limited to within the object area, and it is therefore possible to perform the recognition process in a short period of time. Since the process of detecting the predetermined image object is performed with a high precision, it is possible to detect the predetermined image object precisely. Therefore, with the configuration (1) above, it is possible to provide a recognition process with which it is possible to shorten the amount of time required for detection while maintaining the object detection precision.

(2)

The object detection section may detect the image object by calculating a position of the predetermined image object within the captured image based on the pixel values obtained at the second pitch.

With the configuration (2) above, the position of the predetermined image object within the captured image can be calculated accurately with a high precision. Where the position is calculated as the image object detection result, as with the configuration (2) above, the precision of the position calculated and the amount of time required for the calculation are important. Therefore, as with the configuration (2) above, when calculating the position of the predetermined image object, the present invention is particularly effective because it is possible to shorten the amount of time required for detection while maintaining the detection precision.

(3)

The predetermined image object may include a graphic pattern with a plurality of inner graphic patterns drawn therein. Then, the object detection section detects the plurality of inner graphic patterns from the image of the object area, and calculates a center position of each inner graphic pattern based on the pixel values obtained at the second pitch, thereby detecting the position of the predetermined image object.

The "inner graphic pattern" may be any graphic pattern as long as it is drawn inside the predetermined image object. While it is a plurality of white circles in the embodiment to be described later (FIG. 6), the shape, the number, the size and the color thereof are not limited thereto.

The "center position of an inner graphic pattern" does not have to be the position of the center of the inner graphic pattern in the strict sense, but may be a position in the vicinity of the center of the inner graphic pattern which can be calculated by any of various arithmetic operations. For example, the "center position of an inner graphic pattern" may be calculated as an average value among pixels representing the outline of the inner graphic pattern, or where pixels of the captured image are weighted in some manner, it may be calculated as the center of gravity among pixels within the area of the inner graphic pattern.

With the configuration (3) above, the position of the predetermined image object is detected based on the center position of the inner graphic pattern, rather than the outline of the predetermined image object. Since it is difficult to accurately detect the outline of the predetermined image object if the captured image is blurred, it is not possible to accurately detect the position of the predetermined image object from the outline. In contrast, the center position can be calculated accurately even if the captured image is blurred. Therefore, with the configuration (3) above, it is possible to accurately calculate the position of the predetermined image object even if the captured image is blurred.

(4)

The image recognition program may instruct the computer to further function as an outline extraction section for extracting an outline of the predetermined image object in the object area detected by the area detection section. Then, the object detection section detects the plurality of inner graphic patterns from an area within the outline extracted by the outline extraction section.

With the configuration (4) above, since the inner graphic pattern is detected from the area within the outline extracted by the outline extraction section, it is possible to appropriately determine the range across which the detection of the inner graphic pattern is performed. Thus, it is possible to prevent the process of detecting the inner graphic pattern from being performed wastefully on unnecessary areas, and it is therefore possible to more efficiently perform the recognition process.

(5)

The outline extraction section may extract the outline of the predetermined image object based on pixel values obtained at a third pitch smaller than the first pitch and larger than the second pitch across the captured image.

With the configuration (5) above, since the outline extracting process is performed with a lower precision than that of the process of detecting the inner graphic pattern, it is possible to perform the outline extracting process in a shorter period of time. As a result, it is possible to perform the recognition process in a shorter period of time.

(6)

The image recognition program may instruct the computer to function as an object determination section for determining whether the outline extracted by the outline extraction section represents the predetermined image object. Then, the object detection section detects the plurality of inner graphic patterns from within an area corresponding to an outline that is determined by the object determination section to represent the predetermined image object.

With the configuration (6) above, it is possible to determine whether the predetermined image object is included within the object area based on the extracted outline. Then, if the predetermined image object is not included within the object area, the process of detecting the inner graphic pattern is not performed for that object area. Therefore, with the configuration (6) above, object areas that do not include the predetermined image object can be excluded from the process of detecting the inner graphic pattern, and it is therefore possible to prevent the process of detecting the inner graphic pattern from being performed wastefully. Thus, it is possible to efficiently perform the recognition process and to perform the recognition process in a shorter period of time. Particularly, where the configurations (5) and (6) above are combined with each other, the process of detecting the inner graphic pattern which requires a relatively long time (as it is performed with a high precision) can be omitted by virtue of the outline extracting process which is performed relatively quickly (as it is performed with a low precision), and it is therefore possible to perform the recognition process more efficiently.

(7)

The object detection section may include an inner area detection section and a position calculation section. The inner area detection section detects areas of a plurality of inner graphic patterns in the object area. The position calculation section calculates center positions of areas detected by the inner area detection section.

With the configuration (7) above, the process detects an area of the inner graphic pattern and calculates the center position of the detected area, and it is therefore possible to easily calculate the center position of the inner graphic pattern.

(8)

The inner area detection section may detect areas of the plurality of inner graphic patterns based on pixel values obtained at a fourth pitch smaller than the first pitch and larger than the second pitch across the captured image.

With the configuration (8) above, the process of detecting the area of the inner graphic pattern is performed with a lower precision than the process of calculating the center position, and it is therefore possible to perform the process of detecting the area of the inner graphic pattern in a shorter period of time. As a result, it is possible to perform the recognition process in a shorter period of time.

(9)

The object detection section may further include a number-of-areas determination section for determining whether the number of areas detected by the inner area detection section is a number within a predetermined range. Then, the position calculation section calculates center positions of the areas detected by the inner area detection section for the object area where a number of areas, within the predetermined range, have been detected.

With the configuration (9) above, it is possible to determine whether the number of areas which have been detected by the inner area detection section is an appropriate number. If the number of areas is not appropriate, it is determined that the predetermined image object is not included in that object area, and the process of calculating the center positions is not performed for the object area. Therefore, with the configuration (9) above, object areas that do not include the predetermined image object can be excluded from the process of calculating the center positions, and it is therefore possible to prevent the calculation process from being performed wastefully. Thus, it is possible to efficiently perform the recognition process and to perform the recognition process in a shorter period of time. Particularly, where the configurations (8) and (9) above are combined with each other, the process of calculating the center positions which requires a relatively long time (as it is performed with a high precision) can be omitted by virtue of the process of detecting the area of the inner graphic pattern which is performed relatively quickly (as it is performed with a low precision), and it is therefore possible to perform the recognition process more efficiently.

(10)

The area detection section may detect the object area by extracting an outline of the predetermined image object based on pixel values of pixels adjacent to one another at the first pitch.

With the configuration (10) above, it is possible to easily detect the object area by extracting the outline of the predetermined image object.

(11)

The area detection section may detect the object area based on pixel values of pixels arranged at the first pitch among all pixels of the captured image obtained by the image obtaining section. Then, the object detection section detects the predetermined image object based on pixel values of pixels arranged at the second pitch among all pixels of the captured image obtained by the image obtaining section.

With the configuration (11) above, the same captured image can be used between the object area detection process and the process of detecting the predetermined image object. Thus, there is no need to produce the low-resolution image, and it is therefore possible to perform the recognition process more easily and in a shorter period of time.

(12)

The image recognition program may instruct the computer to further function as a pattern obtaining section for obtaining a pattern image representing the predetermined image object from a storage section that can be accessed by the information processing apparatus. Then, the object detection section determines whether the predetermined image object is included in the object area by comparing an image of the object area with the pattern image.

With the configuration (12) above, it is possible to easily detect the predetermined image object by a so-called "pattern matching" method.

(13)

The object detection section may extract an outline of the predetermined image object from an image of the object area based on the pixel values obtained at the second pitch, and calculate a position of the predetermined image object in the captured image based on the extracted outline.

With the configuration (13) above, it is possible to easily calculate the position of the predetermined image object within the captured image based on the outline of the predetermined image object.

(14)

The image recognition program may instruct the computer to further function as a positional relationship calculation section and a display control section. The positional relationship calculation section calculates a positional relationship between the predetermined image object and the image-capturing section based on the detection results of the object detection section when the object detection section detects the predetermined image object. The display control section produces a virtual image representing a virtual object placed in a virtual space based on the positional relationship, and displays on a display section an image obtained by synthesizing the virtual image with the captured image.

With the configuration (14) above, a quick and precise recognition process can be used in an augmented reality technique for displaying a synthesized image obtained by synthesizing together a captured image and a virtual image. Note that in an augmented reality technique, it is required to accurately detect the predetermined image object in the recognition process in order to accurately synthesize the captured image with the virtual image without misalignment. Therefore, the quick and precise recognition process of the configuration (1) above is particularly effective.

The present invention may also be embodied in the form of an image recognition apparatus including various sections similar to those described above. In such an image recognition apparatus, the various sections may be implemented by a computer executing an image recognition program, or some or all of the various sections may be implemented by a dedicated circuit or circuits. The present invention may also be embodied in the form of an image recognition system including one or more information processing apparatuses each having various sections described above. Then, the one or more information processing apparatuses may communicate with each other directly via a wired or wireless connection, or may communicate with each other via a network. Moreover, the present invention may also be embodied in the form of an image recognition method performed by the various sections described above.

According to the present invention, the area detection section detects the object area first with a low precision, and then the process of detecting the predetermined image object from the object area is performed with a high precision. Therefore, it is possible to shorten the amount of time required for detection while maintaining the object detection precision.

These and other objects, features, aspects and advantages of the present invention will become more apparent from the following detailed description of the present invention when taken in conjunction with the accompanying drawings.

DESCRIPTION OF THE PREFERRED EMBODIMENTS

Hardware Configuration of Game Apparatus

Figure 1:
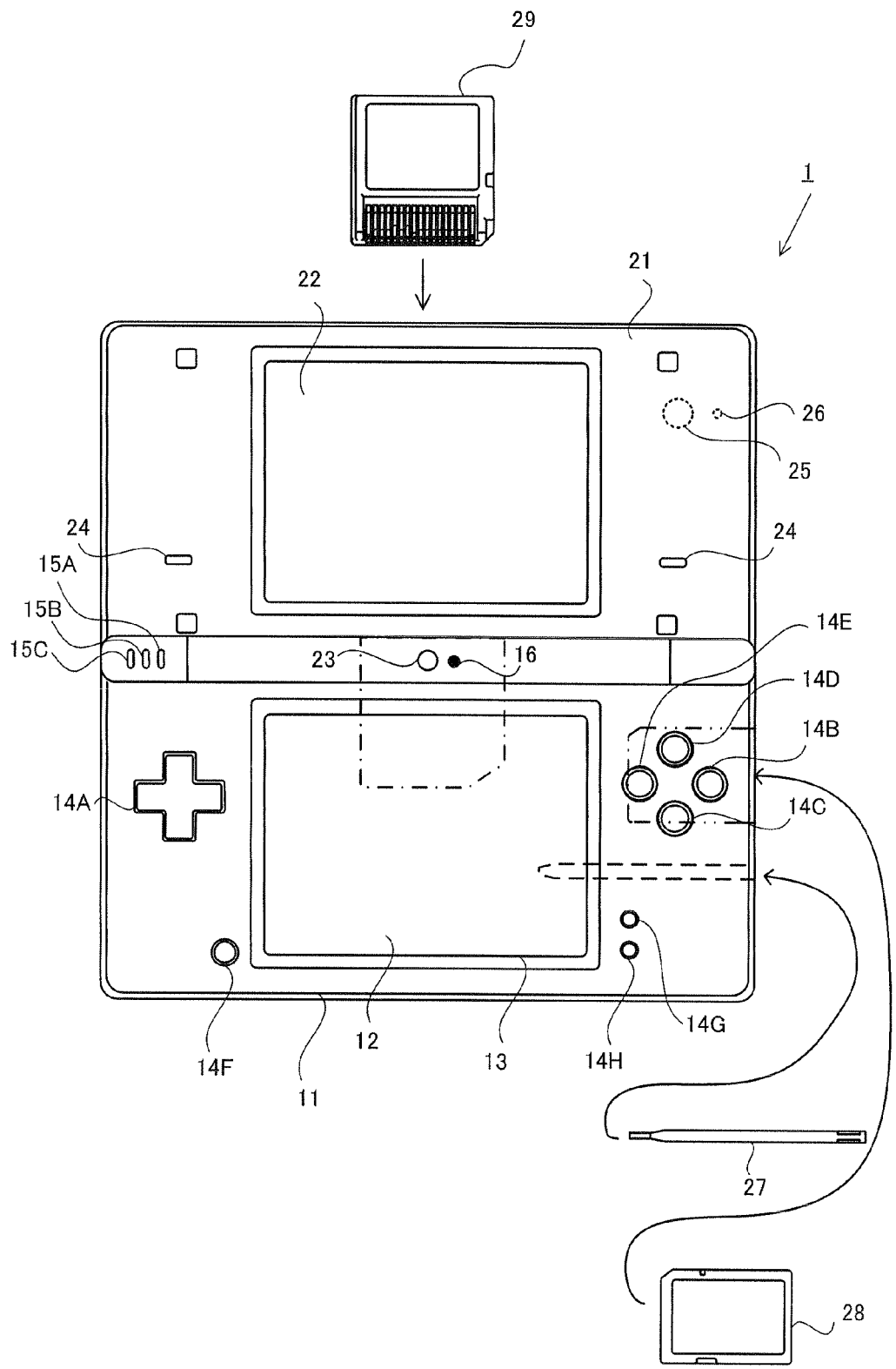
FIG. 1 is an external view of a game apparatus of the present embodiment.

Referring to the drawings, an image recognition program and an image recognition apparatus according to one embodiment of the present invention will be described. While the present invention is realized by executing an image recognition program by any information processing apparatus (computer) which displays an image on a display apparatus, the present embodiment is directed to a case where a game apparatus 1 shown in FIG. 1 is used as an example of the information processing apparatus.

FIG. 1 is an external view of the game apparatus 1 according to the present embodiment. Here, a hand-held game apparatus is shown as an example of the game apparatus 1. Note that the game apparatus 1 includes a camera and functions as an image-capturing device for capturing an image with the camera, displaying the captured image on the screen, and storing data for the captured image.

In FIG. 1, the game apparatus 1 is a foldable hand-held game apparatus, and the game apparatus 1 shown in the figure is unfolded (open state). The game apparatus 1 is structured in a size allowing the user to hold it with both hands, or even one hand, when unfolded.

The game apparatus 1 has a lower housing 11 and an upper housing 21. The lower housing 11 and the upper housing 21 are connected so as to be openable/closable (foldable). In the example of FIG. 1, the lower housing 11 and the upper housing 21 are each formed in the shape of a horizontally elongated rectangular plate, and connected so as to be pivotable at their common long side joint. Typically, the user uses the game apparatus 1 in open state. Also, when the user does not use the game apparatus 1, the game apparatus 1 is stored in closed state. In addition, in the example shown in FIG. 1, the game apparatus 1 can maintain not only the closed and open states but also its opening state via friction force generated at the joint at any angle that can be made by the lower housing 11 and the upper housing 21 between the closed and open states. That is, the upper housing 21 can remain stationary at an arbitrary angle with respect to the lower housing 11.

The lower housing 11 is provided with a lower LCD (Liquid Crystal Display) 12. The lower LCD 12 is horizontally long, and is arranged such that its longitudinal direction coincides with the longitudinal direction of the lower housing 11. Note that in the present embodiment, LCDs are used as display devices to be included in the game apparatus 1, but any other display devices, such as EL (Electro Luminescence) display devices, may be used. In addition, display devices of any resolution can be used for the game apparatus 1. Note that an image being captured by an internal camera 23 or an external camera 25 is displayed in real-time on lower LCD 12.

The lower housing 11 is provided with various operation buttons 14A to 14K and a touch panel 13 as input devices. As shown in FIG. 1, of all the operation buttons 14A to 14K, the direction input button 14A, the operation button 14B, the operation button 14C, the operation button 14D, the operation button 14E, the power button 14F, the start button 14G, and the select button 14H are provided at the inner principal surface of the lower housing 11. The inner principal surface is a surface to be the interior side when the upper housing 21 and the lower housing 11 are folded. In the example shown in FIG. 1, the direction input button 14A and the power button 14F are provided to the left or right (in FIG. 1, to the left) of a lower LCD 12 provided at the center of the inner principal surface of the lower housing 11. In addition, the operation buttons 14B to 14E, the start button 14G, and the select button 14H are provided to the opposite side (in FIG. 1, to the right) of the lower LCD 12 on the inner principal surface of the lower housing 11. The direction input button 14A, the operation buttons 14B to 14E, the start button 14G, and the select button 14H are used for various operations on the game apparatus 1. For example, the direction input button 14A is used for selection operations and so on. The operation buttons 14B to 145 are used for setting and cancellation operations and so on. The power button 14F is used for turning ON/OFF the game apparatus 1.

Note that in FIG. 1, the operation buttons 14I to 14K are not shown. For example, the L button 14I is provided at the left edge of the upper surface of the lower housing 11, and the R button 14J is provided at the right edge of the upper surface of the lower housing 11. For example, the L button 14I and the R button 14J are used for image-capturing instruction operations (shutter operations) on the game apparatus 1 having an image-capturing function. Furthermore, the volume button 14K is provided at the left side surface of the lower housing 11. The volume button 14K is used for controlling the volume of a speaker included in the game apparatus 1.

Also, in addition to the operation buttons 14A to 14K, the game apparatus 1 further includes a touch panel 13 as an example of a pointing device that is an input device allowing designation of an arbitrary position on the screen. The touch panel 13 is attached so as to cover the screen of the lower LCD 12. Note that in the present embodiment, a touch panel 13 is, for example, of a resistive film type. However, a touch panel 13 is not limited to the resistive film type, and may be of any type. Also, in the present embodiment, for example, the touch panel 13 has the same resolution (detection accuracy) as the lower LCD 12. However, the touch panel 13 is not necessarily required to be equal in resolution to the lower LCD 12. In addition, the lower housing 11 has an insertion opening (in FIG. 1, indicated by broken lines) provided in its right side surface. The insertion opening can store a touch pen 27 to be used for operating the touch panel 13. Note that any input to the touch panel 13 (touch input) is normally performed with the touch pen 27, but the touch pen 27 is not restrictive, and the touch panel 13 can be operated with the user's finger.

Also, the lower housing 11 has provided in the right side surface an insertion opening (in FIG. 1, indicated by two-dot chain lines) for storing a memory card 28. The insertion opening has provided therein a connector (not shown) for electrically connecting the game apparatus 1 and the memory card 28. The memory card 28 is, for example, an SD (Secure Digital) memory card removably attached to the connector. For example, the memory card 28 is used for storing (saving) images captured by the game apparatus 1 and reading into the game apparatus 1 images generated by other apparatuses.

Furthermore, the lower housing 11 has provided in its upper side surface an insertion opening (in FIG. 1, indicated by one-dot chain lines) for storing a memory card 29. This insertion opening also has provided therein a connector (not shown) for electrically connecting the game apparatus 1 and the memory card 29. The memory card 29 is a storage medium having an information processing program such as a game program stored therein, and is removably loaded into the insertion opening provided in the lower housing 11.

Three LEDs 15A to 15C are provided to the left of the joint between the lower housing 11 and the upper housing 21. Here, the game apparatus 1 is capable of wirelessly communicating with other equipment, and the first LED 15A is lit up while the game apparatus 1 is ON. The second LED 15B is lit up while the game apparatus 1 is being charged. The third LED 15C is lit up when wireless communication is established. Accordingly, the three LEDs 15A to 15C allow the user to know the statuses of the game apparatus 1, regarding ON/OFF of the power supply, battery charge, and communications.

On the other hand, the upper housing 21 is provided with an upper LCD 22. The upper LCD 22 is horizontally long, and is arranged such that its longitudinal direction coincides with the longitudinal direction of the upper housing 12. Note that as in the case of the lower LCD 12, any display device of any other type and resolution may be used instead of the upper LCD 22. Note that a touch panel may be provided over the upper LCD 22. The upper LCD 22 displays, for example, an operation instruction screen for teaching the user about the roles of the operation buttons 14A to 14K and the touch panel 13.

Also, the upper housing 21 is provided with two cameras (an internal camera 23 and an external camera 25). As shown in FIG. 1, an internal camera 23 is provided at the inner principal surface close to the joint of the upper housing 21. On the other hand, the external camera 25 is provided opposite to the side of the inner principal surface where the internal camera 23 is provided, i.e., the external principal surface of the upper housing 21 (the exterior surface of the game apparatus 1 in closed state; the back of the upper housing 21 shown in FIG. 1). Note that in FIG. 1, the external camera 25 is indicated by a broken circle. As a result, the internal camera 23 can capture images of the direction in which the inner principal surface of the upper housing 21 is oriented, while the external camera 25 can capture images of the direction opposite to the image-capturing direction of the internal camera 23, i.e., the direction in which the external principal surface of the upper housing 21 is oriented. In this manner, in the present embodiment, the two cameras, i.e., the internal and external cameras 23 and 25, are provided so as to capture images in their respective directions opposite to each other. For example, the user can use the internal camera 23 to capture images of a view from the game apparatus 1 toward the user, and also can use the external camera 25 to capture images of a view in the opposite direction, i.e., from the user toward the game apparatus 1.

Note that a microphone (microphone 43 shown in FIG. 2) is provided as an audio input device under the inner principal surface close to the joint. In addition, a microphone hole 16 is provided in the inner principal surface close to the joint such that the microphone 43 can sense sound from outside the game apparatus 1. The microphone 43 and the microphone hole 16 are not necessarily required to be positioned at the joint. For example, the microphone 43 may be accommodated within the lower housing 11, and the microphone hole 16 may be provided in the lower housing 11 at a position corresponding to the position where the microphone 43 is accommodated.

Also, a fourth LED 26 (in FIG. 1, indicated by a broken circle) is provided at the external principal surface of the upper housing 21. The fourth LED 26 is lit up at the time the internal camera 23 or the external camera 25 captures an image (when the shutter button is pressed). Furthermore, the light is on while the internal camera 23 or the external camera 25 is capturing a motion picture. As such, the fourth LED 26 allows any subject and bystander to know the game apparatus 1 captured (or is capturing) a picture.

Also, a sound hole 24 is provided to both the left and the right of an upper LCD 22 provided at the center of the inner principal surface of the upper housing 21. A speaker is accommodated within the upper housing 21 below each sound hole 24. The sound hole 24 is a hole for emanating the sound from the speaker to the outside of the game apparatus 1.

As described above, the upper housing 21 is provided with the internal and external cameras 23 and 25 which are image-capturing means for capturing images, as well as the upper LCD 22 acting as a display means for mainly displaying the operation instruction screen. On the other hand, the lower housing 11 is provided with the input devices (the touch panel 13 and the operation buttons 14A to 14K) for operational inputs to the game apparatus 1, and the lower LCD 12 acting as a display means for displaying captured images. Accordingly, when using the game apparatus 1, the user can see a captured image (an image captured by the camera) displayed on the lower LCD 12 and make inputs via the input devices while holding the lower housing 11.

Figure 2:
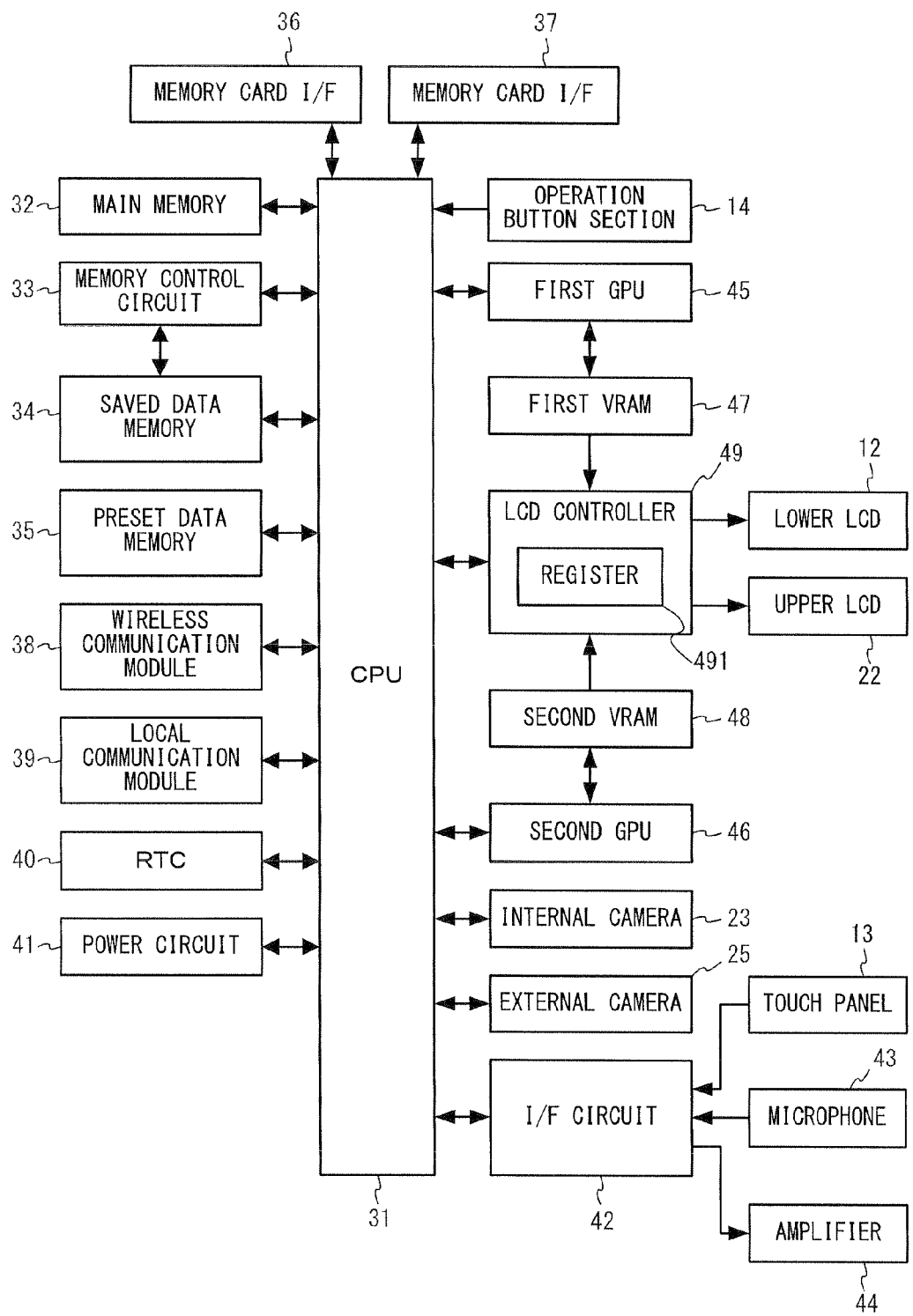
FIG. 2 is a block diagram showing an example of an internal configuration of the game apparatus.

Next, an internal configuration of the game apparatus 1 will be described with reference to FIG. 2. FIG. 2 is a block diagram illustrating an exemplary internal configuration of the game apparatus 1.

In FIG. 2, the game apparatus 1 includes electronic parts, such as a CPU 31, a main memory 32, a memory control circuit 33, a saved data memory 34, a preset data memory 35, a memory card interface (memory card I/F) 36, a memory card I/F 37, a wireless communication module 38, a local communication module 39, a real time clock (RTC) 40, a power circuit 41, an interface circuit (I/F circuit) 42, a first GPU (Graphics Processing Unit) 45, a second GPU 46, a first VRAM (Video RAM) 47, a second VRAM 48, and an LCD controller 49. These electronic parts are mounted on an electronic circuit board, and accommodated within the lower housing 11 (or may be accommodated within the upper housing 21).

The CPU 31 is an information processing means for executing a predetermined program (here, an image display program according to the present embodiment). In the present embodiment, the game program is stored, as an example of the image display program, in a memory (e.g., saved data memory 34) within the game apparatus 1 as well as in the memory card 28 and/or 29, and the CPU 31 executes the game program, thereby executing a game process to be described later. Note that the program to be executed by the CPU 31 may be prestored in the memory within the game apparatus 1 or may be acquired from the memory card 28 and/or 29 or from other equipment through communication therewith.

The CPU 31 is connected to the main memory 32, the memory control circuit 33, and the preset data memory 35. The memory control circuit 33 is connected to the saved data memory 34. The main memory 32 is a storage means used as a working area or buffering area for the CPU 31. Specifically, a main memory 32 stores various data to be used in the game process, and programs acquired from outside (e.g., the memory cards 28 and 29 and other equipment). In the present embodiment, for example, a PSRAM (Pseudo-SRAM) is used as the main memory 32. The saved data memory 34 is a storage means for storing, for example, the programs to be executed by the CPU 31 and data for images captured by the internal camera 23 and the external camera 25. The saved data memory 34 is configured by a nonvolatile storage medium, e.g., in the present embodiment, a NAND flash memory. The memory control circuit 33 is a circuit for controlling data reading from/writing to the saved data memory 34 in accordance with an instruction by the CPU 31. The preset data memory 35 is a storage means for storing data (preset data) such as various present parameters for the game apparatus 1. As for the preset data memory 35, a flash memory connected to the CPU 31 via an SPI (Serial Peripheral Interface) bus can be used.

The memory card I/Fs 36 and 37 are each connected to the CPU 31. The memory card I/F 36 reads/writes data from/to the memory card 28 attached to the connector in accordance with an instruction from the CPU 31. Also, the memory card I/F 37 reads/writes data from/to the memory card 29 attached to the connector in accordance with an instruction from the CPU 31. In the present embodiment, image data captured by the internal camera 23 and the external camera 25, as well as image data received from other devices are written into the memory card 28, and image data stored in the memory card 28 is read from the memory card 28 and stored to the saved data memory 34 or transmitted to other devices. In addition, various programs stored in the memory card 29 are read and executed by the CPU 31.

Note that the game program may be supplied to a computer system not only via an external storage medium, such as the memory card 29, but also via a wired or wireless communication line. Also, the game program may be pre-recorded to a nonvolatile storage device within the computer system. Note that the information storage medium for storing the game program is not limited to the nonvolatile storage device, and may be a CD-ROM, a DVD, or a similar optical disk storage medium.

The wireless communication module 38 has a function of connecting to a wireless LAN in accordance with a system complying with, for example, the IEEE802.11.b/g standard. Also, the local communication module 39 has a function of wirelessly communicating with similar game apparatuses in accordance with a predetermined communication system. The wireless communication module 38 and the local communication module 39 are connected to the CPU 31. The CPU 31 is capable of transmitting/receiving data to/from other equipment via the Internet using the wireless communication module 38, as well as transmitting/receiving data to/from other similar game apparatuses via the Internet using the local communication module 39.

The CPU 31 is also connected to the RTC 40 and the power circuit 41. The RTC 40 counts time and provides an output to the CPU 31. For example, the CPU 31 can calculate the current time (date) based on the time counted by the RTC 40. The power circuit 41 controls power supplied from the power supply (typically, a battery accommodated in the lower housing 11) provided in the game apparatus 1, and supplies power to various parts of the game apparatus 1.

The game apparatus 1 is also provided with the microphone 43 and an amplifier 44. The microphone 43 and the amplifier 44 are each connected to the I/F circuit 42. The microphone 43 senses the voice of the user speaking to the game apparatus 1, and outputs an audio signal representing the voice to the I/F circuit 42. The amplifier 44 amplifies the audio signal from the I/F circuit 42 to provide an output from the speaker (not shown). The I/F circuit 42 is connected to the CPU 31.

Also, the touch panel 13 is connected to the I/F circuit 42. The I/F circuit 42 includes an audio control circuit for controlling the microphone 43 and the amplifier 44 (speaker), and a touch panel control circuit for controlling the touch panel 13. The audio control circuit performs A/D conversion and D/A conversion on the audio signal, and also converts the audio signal into audio data of a predetermined format. The touch panel control circuit generates touch position data (detected coordinate data to be described later) of a predetermined format based on a signal from the touch panel 13, and outputs the generated data to the CPU 31. The touch position data is data representing coordinates of a position detected by the touch panel 13 as being the position at which an input was made to the input screen of the touch panel 13. Note that the touch panel control circuit performs reading of a signal from the touch panel 13 and generation of detected coordinate data once every predetermined period of time.

The above-described operation buttons 14A to 14K constitute an operation button section 14 connected to the CPU 31. The operation button section 14 outputs to the CPU 31 operation data representing the status of input to the operation buttons 14A to 14K (whether or not the buttons have been pressed). The CPU 31 acquires the operation data from the operation button section 14, and executes a process in accordance with an input to the operation button section 14.

The internal camera 23 and the external camera 25 are each connected to the CPU 31. The internal camera 23 and the external camera 25 each capture an image in accordance with an instruction from the CPU 31, and output data for the captured image to the CPU 31. In the present embodiment, the CPU 31 gives an image-capturing instruction to either the internal camera 23 or the external camera 25, and the camera receiving the image-capturing instruction captures an image and transmits image data to the CPU 31. Note that the internal camera 23 and the external camera 25 are also capable of capturing motion pictures. That is, the internal camera 23 and the external camera 25 are also capable of repeatedly capturing images and repeatedly sending the captured data to the CPU 31.

The first GPU 45 is connected to the first VRAM 47, and the second GPU 46 is connected to the second VRAM 48. In accordance with an instruction from the CPU 31, the first GPU 45 generates a first display image based on display image generation data stored in the main memory 32, and creates an image on the first VRAM 47. In accordance with an instruction from the CPU 31, the second GPU 46 generates a second display image, and creates an image on the second VRAM 48, as in the case of the first GPU 45. The first VRAM 47 and the second VRAM 48 are connected to the LCD controller 49.

The LCD controller 49 includes a register 491. The register 491 stores the value of 0 or 1 in accordance with an instruction from the CPU 31. When the value in the register 491 is 0, the LCD controller 49 outputs the first display image created on the first VRAM 47 to the lower LCD 12, and also outputs the second display image created on the second VRAM 48 to the upper LCD 22. Alternatively, when the value in the register 491 is 1, the LCD controller 49 outputs the first display image created on the first VRAM 47 to the upper LCD 22, and also outputs the second display image created on the second VRAM 48 to the lower LCD 12. For example, the CPU 31 is capable of causing the lower LCD 12 to display an image acquired from either the internal camera 23 or the external camera 25, while causing the upper LCD 22 to display an operation instruction screen generated by a predetermined process.

[Outline of Game Process]

Next, game processes to be performed during a game process executed by the game program will be described with reference to FIGS. 3 to 9. The game program performs an image recognition process on an image (captured image) of the real space captured by a camera, and allows a player to play a game while displaying a game image obtained by synthesizing an image (virtual image) of the virtual space with the captured image based on the results of the image recognition process.

Figure 3:
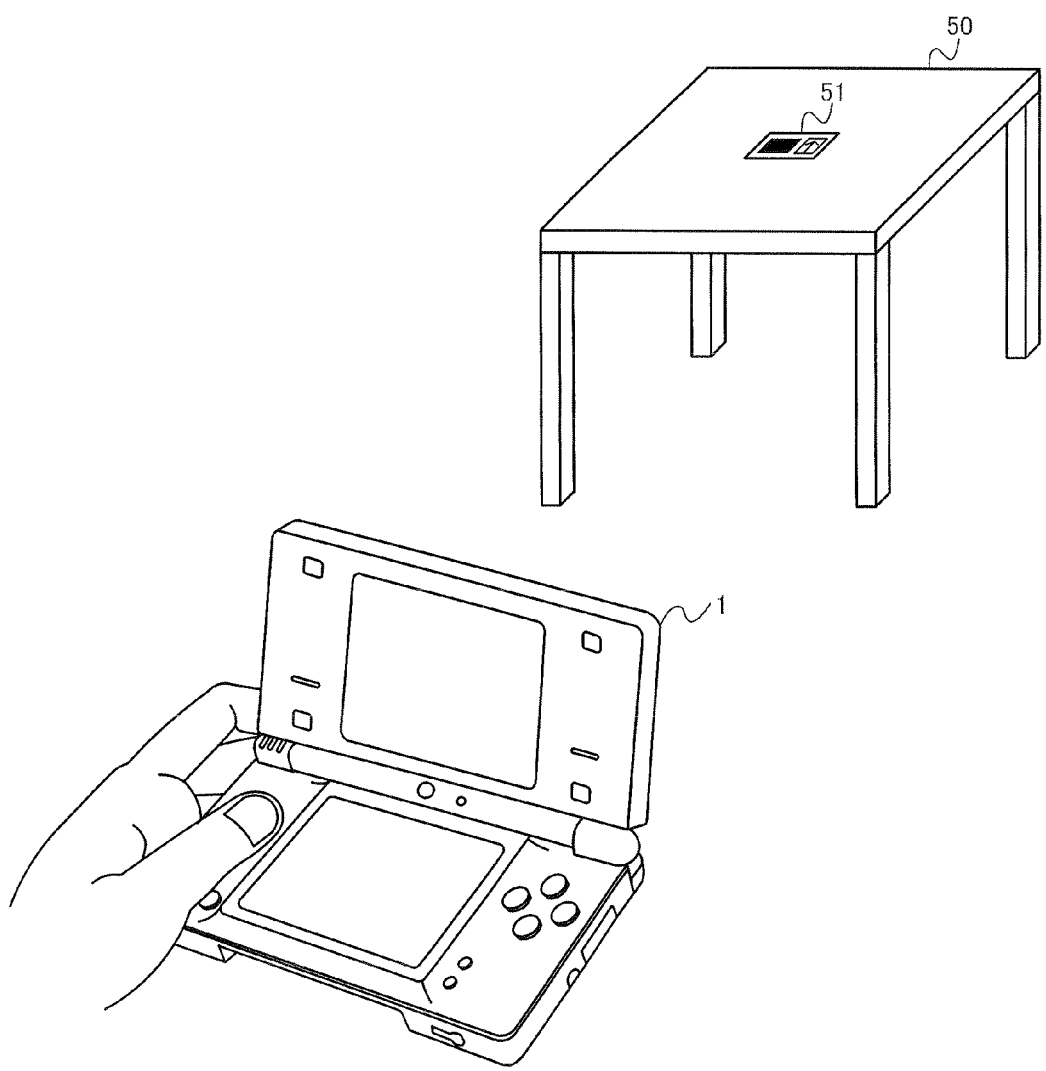
FIG. 3 is a view showing an example of how the game apparatus is used.

FIG. 3 is a view showing an example of how the game apparatus is used. In the present embodiment, the player (user) places a marker 51 as a predetermined image object at any place (on a table 50 in FIG. 3), and uses the game apparatus 1 to capture an image of the marker 51 and the vicinity thereof, as shown in FIG. 3. While the camera used for image capturing may be either the internal camera 23 or the external camera 25, an example where the external camera 25 is used will be described herein. In the present embodiment, the marker 51 is a thin plate-like marker with a predetermined pattern (see FIG. 6) drawn thereon.

Figure 4:
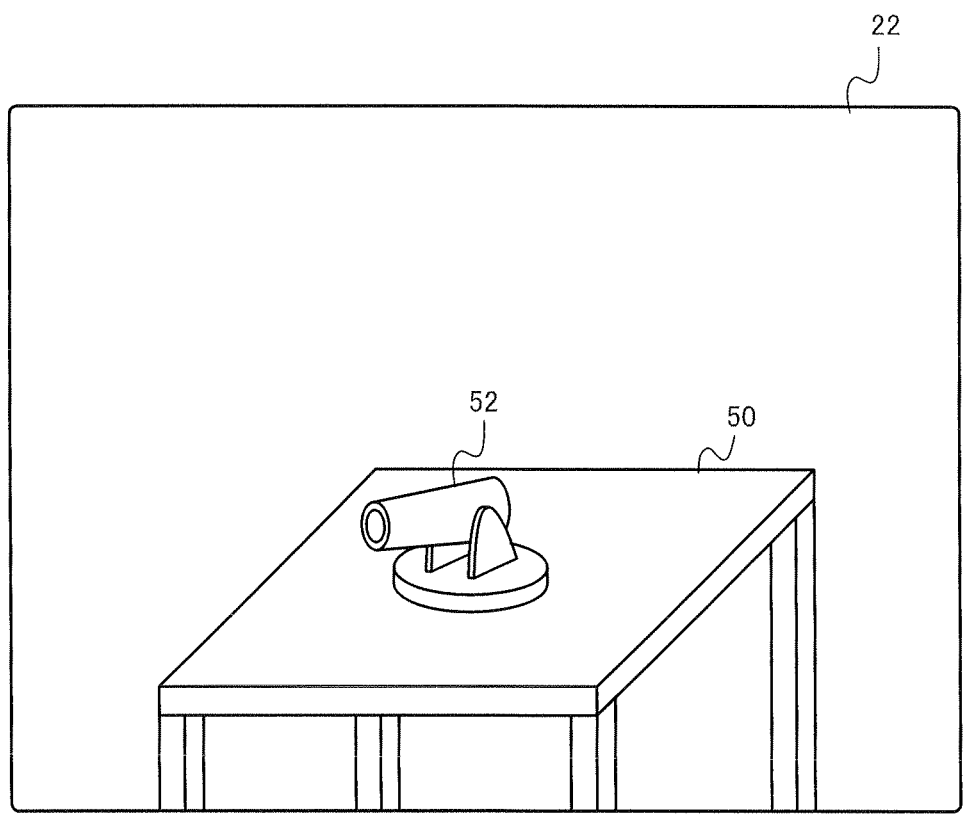
FIG. 4 is a view showing an example of a game image displayed on the game apparatus.

FIG. 4 is a view showing an example of a game image displayed on the game apparatus. FIG. 4 shows a game image to be displayed on the upper LCD 22 of the game apparatus 1 when the game apparatus 1 captures an image of the marker 51 placed on the table 50 as shown in FIG. 3. Note that while the game image is displayed on the upper LCD 22 in the present embodiment, the game image may be displayed on the lower LCD 12. As shown in FIG. 4, an image of a cannon 52, as an image (virtual image) of a virtual object in the virtual space, is displayed on the upper LCD 22 while being synthesized with the captured image. Thus, it is possible to display an image which looks as if the cannon 52 were present on the actual table 50. Note that while FIG. 4 shows an image of the cannon 52 as an example of the virtual object, the virtual object may be any object. Thus, in the present embodiment, a game image is displayed as if a virtual object were present in the real space by using an augmented reality technique.

Note that an image (synthesized image) obtained by synthesizing a virtual image with a captured image can be produced by the following process, for example. That is, the game apparatus 1 first performs an (image) recognition process of recognizing the marker 51 contained in the image captured by the camera. Here, as process results of the recognition process, information representing the position and direction of the marker 51 in the captured image is calculated. When the marker 51 is recognized, the game apparatus 1 calculates the positional relationship between the game apparatus 1 (camera) and the marker 51 from the position and direction of the marker 51 which are process results of the recognition process. Moreover, the game apparatus 1 calculates the position and orientation of the virtual camera in the virtual space based on the positional relationship. The position and orientation of the virtual camera are calculated so that the positional relationship between the virtual camera and the virtual object in the virtual space coincides with the positional relationship between the game apparatus 1 and the marker 51 in the real space. Once the position of the virtual camera is determined, the game apparatus 1 produces a virtual image showing the virtual object as viewed from the position of the virtual camera, and synthesizes the virtual image with the captured image. By the process described above, the game apparatus 1 can produce and display a synthesized image. Note that the process of calculating the position of the virtual camera from the positional relationship may be similar to a process of a conventional augmented reality technique.

[Outline of Image Recognition Process]

As described above, in the present embodiment, the game apparatus 1 detects the marker 51 from the captured image by the recognition process. If the marker 51 cannot be accurately detected in the recognition process, it is not possible to accurately produce the virtual image, and it is then no longer possible to synthesize the virtual image at a correct position on the captured image, detracting from the realness of the synthesized image. Therefore, in the present embodiment, the game apparatus 1 performs a recognition process as follows so as to accurately and efficiently detect the marker 51.

(Recognition Process Using a Plurality of Different Precisions)

Figure 5:
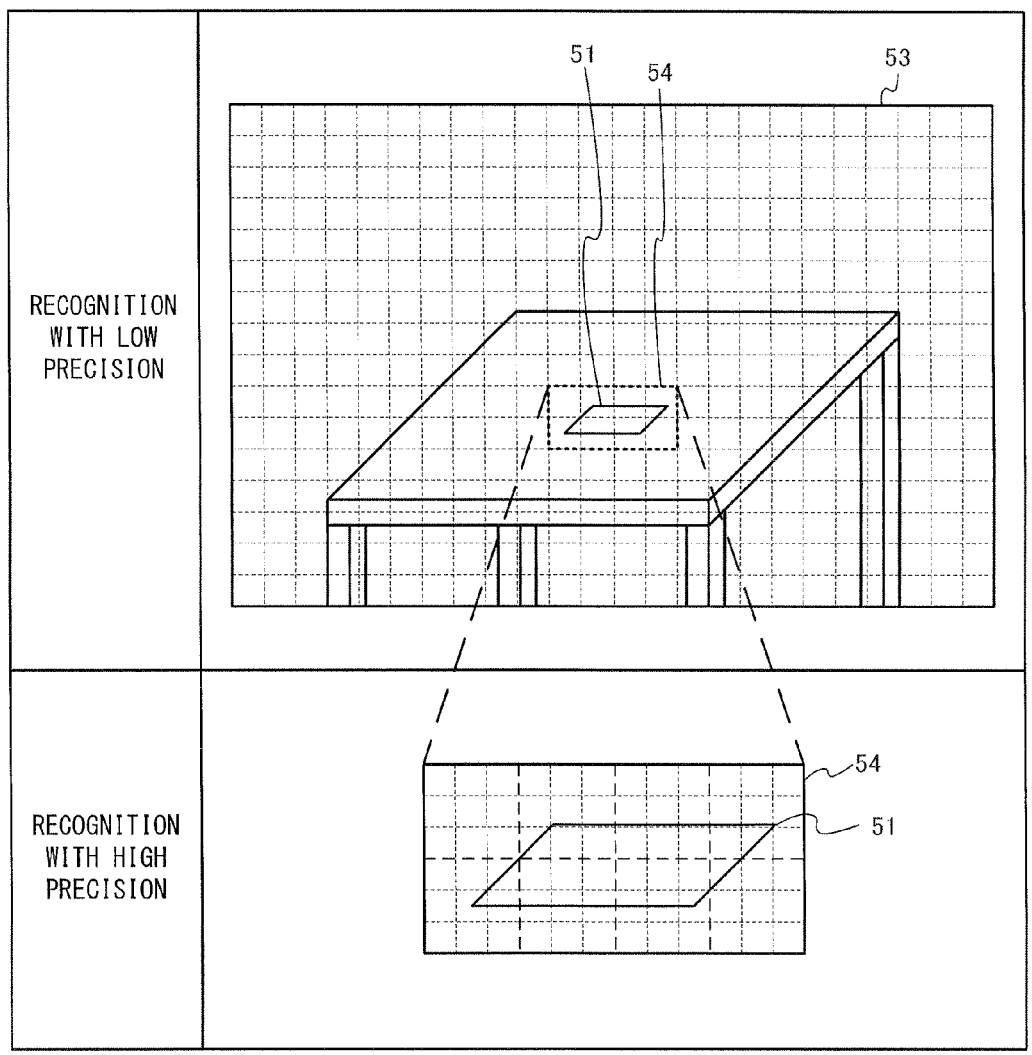
FIG. 5 is a diagram showing an object area used in an image recognition process of the present embodiment.

FIG. 5 is a diagram showing an object area used in the image recognition process of the present embodiment. In the present embodiment, after a captured image to be subjected to a recognition process is obtained, the game apparatus 1 first performs a process (area detection process) of detecting an area (referred to as the "object area") 54 of the captured image that includes the marker 51 (see the upper section of the table shown in FIG. 5). The area detection process is performed on an entire area 53 of the captured image and is performed with a lower precision than that of the marker detection process to be described later. Herein, the term "lower precision" means relatively increasing the interval between pixels whose pixel values are to be referenced in the process. For example, in the present embodiment, the game apparatus 1 performs the area detection process by referencing pixel values at a 3-pixel pitch across the captured image (i.e., by referencing pixel values of pixels while skipping two pixels therebetween). Thus, since the process of detecting the object area 54 is performed with a lower precision, the detection process is performed relatively quickly.

After the object area 54 is detected, the game apparatus 1 performs a process (marker detection process) of detecting the marker 51 from the image of the object area 54. The marker detection process is performed only on the object area 54 (rather than the entire area 53 of the captured image) and is performed with a higher precision than that of the area detection process described above (see the lower section of FIG. 5). That is, in the marker detection process, pixels are referenced in a finer manner than the area detection process, i.e., the interval between pixels whose pixel values are to be referenced is smaller than that of the area detection process. Specifically, in the present embodiment, the game apparatus 1 performs the area detection process by referencing the pixel values at a 1-pixel pitch across the captured image (i.e., by referencing the pixel value of every pixel). Thus, since the marker detection process is performed with a higher precision, the position and direction of the marker 51 obtained as detection results are calculated with a high precision. Since the marker detection process is performed only on the object area 54, the game apparatus 1 can perform the process more quickly than when the process is performed on the entire area 53 of the captured image.

As described above, in the present embodiment, the game apparatus 1 first performs the process of detecting the object area 54, and then performs the process of detecting the marker 51 on the object area 54. Therefore, the process of detecting the marker 51 can be performed only on the required area (i.e., the object area), and the process of detecting the marker 51 can be performed in a short period of time. Since the process of detecting the object area 54 is performed with a lower precision, the detection process can also be performed in a short period of time, and it is therefore possible to perform the entire recognition process in a short period of time. Moreover, since the process of detecting the marker 51 is performed with a higher precision, the position and direction of the marker 51 obtained as recognition results can be calculated with a high precision. That is, according to the present embodiment, it is possible to quickly and precisely perform the recognition process of detecting the marker 51 from the captured image.

Note that different precisions are used within the marker detection process in the present embodiment. That is, the marker detection process includes a plurality of processes which are performed with different precisions. The details of these processes will be described later.

(Recognition Process of Detecting Marker Based on Center Position of Inner Graphic Pattern)

Figure 6:
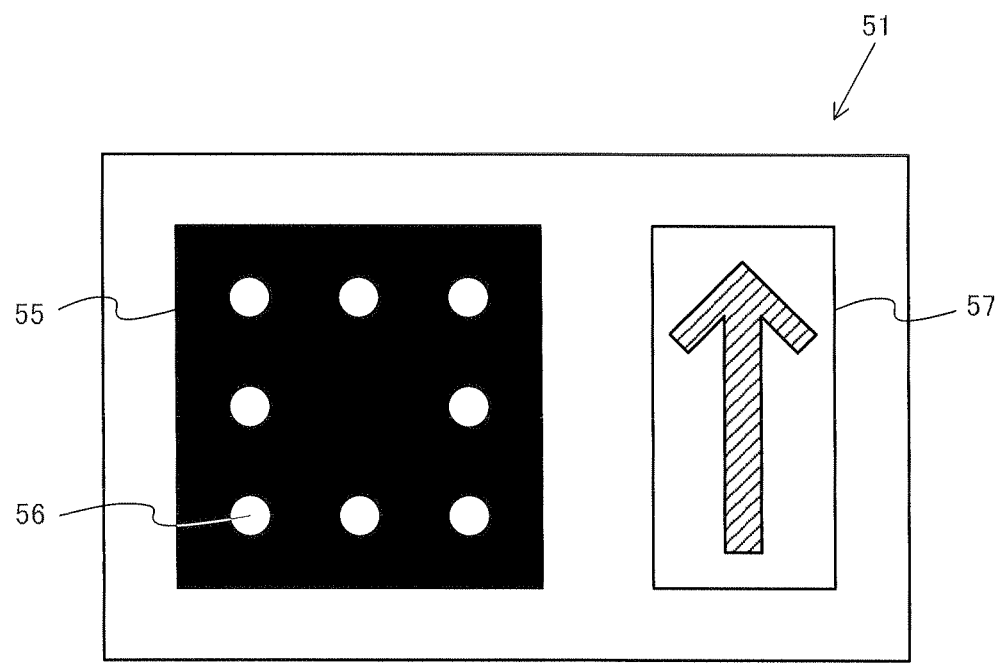
FIG. 6 is a diagram showing a marker used in the present embodiment.

The recognition process of the present embodiment uses the marker 51 with a graphic pattern thereon including a plurality of inner graphic patterns, and detects the marker 51 by calculating the center positions of the inner graphic patterns. FIG. 6 is a diagram showing the marker used in the present embodiment. As shown in FIG. 6, the marker 51 includes a first graphic pattern 55 and a second graphic pattern 57. The first graphic pattern 55 includes a plurality of (eight in FIG. 6) white circular graphic patterns 56 drawn therein. In the present embodiment, the white circular graphic patterns 56 are the inner graphic patterns. In the present embodiment, the eight inner graphic patterns 56 are located at the four vertices of a rectangular shape (square) and the middle points of the four sides thereof. Note that the first graphic pattern may be any pattern with a plurality of graphic patterns (inner graphic patterns) drawn therein, and there is no limitation on the position, shape, size and color of the inner graphic patterns. While the second graphic pattern 57 is an arrow-shaped graphic pattern in FIG. 6, the second graphic pattern 57 may be any graphic pattern.

Note that since the marker 51 shown in FIG. 6 is used in the present embodiment, the game apparatus 1 detects the area of the first graphic pattern 55 of the marker 51 as the object area in the above-described area detection process. Then, in the above-described marker detection process, the position and direction of the marker 51 are detected by detecting the first graphic pattern 55 with a high precision.

Figure 7:
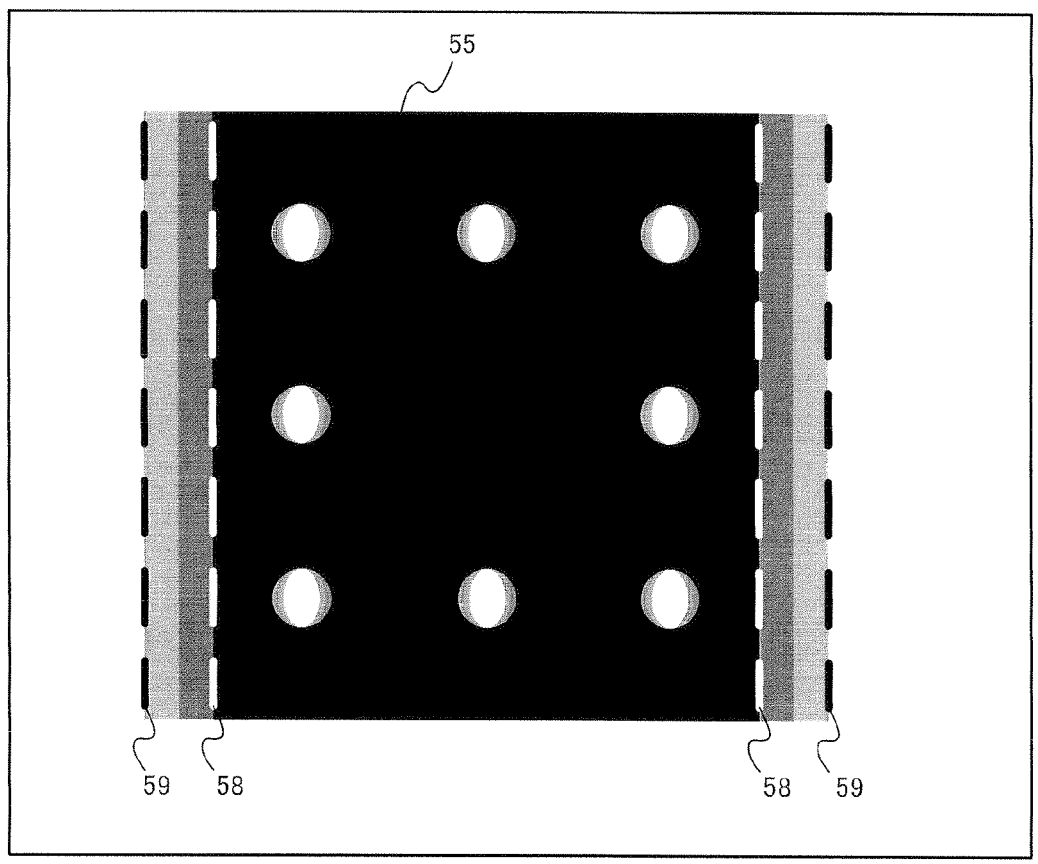
FIG. 7 is a diagram showing an image of a first graphic pattern with the left and right portions of its outline blurred.

Now, a method for detecting the outline of the first graphic pattern 55 of the marker 51 in order to detect the position of the marker 51 will be discussed. FIG. 7 is a diagram showing an image of the first graphic pattern 55 with the left and right portions of its outline blurred. An image captured by a camera may sometimes be blurred and have an unclear outline due to a so-called "camera shake", etc. For example, if the camera (the game apparatus 1) moves left and right when capturing an image, the outline will be blurred in the left-right direction to be unclear as shown in FIG. 7. Where the captured image is blurred and has an unclear outline as described above, it is difficult to detect the outline accurately by the outline detecting method described above, and it is therefore impossible to accurately calculate the position of the graphic pattern. An outline can be detected based on the difference in pixel values (luminance values, color values, etc.) between pixels, for example, but if the captured image is blurred, the detected position of the outline varies substantially depending on the content of the image, the threshold value, etc. For example, with the example of the image shown in FIG. 7, a dotted line 58 shown in FIG. 7 may be detected as an outline, or a dotted line 59 may be detected as an outline. In such cases, the length of the first graphic pattern 55 in the lateral direction is not calculated accurately, and the position of the first graphic pattern 55 cannot be calculated accurately. Thus, with a method for detecting an outline and calculating the position of the marker from the outline, it may not be possible to calculate the position of the marker accurately when the captured image is blurred.

Figure 8:
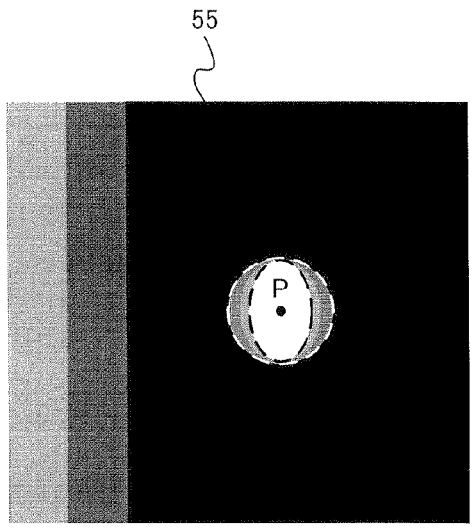
FIG. 8 is a diagram showing the center position of an inner graphic pattern in a part of the first graphic pattern.

Therefore, in the recognition process of the present embodiment, the game apparatus 1 detects the marker 51 by detecting the inner graphic patterns 56 of the first graphic pattern 55, and calculating the center positions of the inner graphic patterns 56. FIG. 8 shows the center position of the inner graphic pattern 56 in a portion of the first graphic pattern 55. In the above-described marker detection process, the game apparatus 1 detects the area (outline) of the inner graphic pattern 56, and calculates the center point P of the detected area (see FIG. 8). Now, referring to FIG. 8, because the captured image is blurred, either the white dotted line or the black dotted line shown in FIG. 8 may be detected as the outline, but the position of the center point P will be the same in either case.

Figure 9:
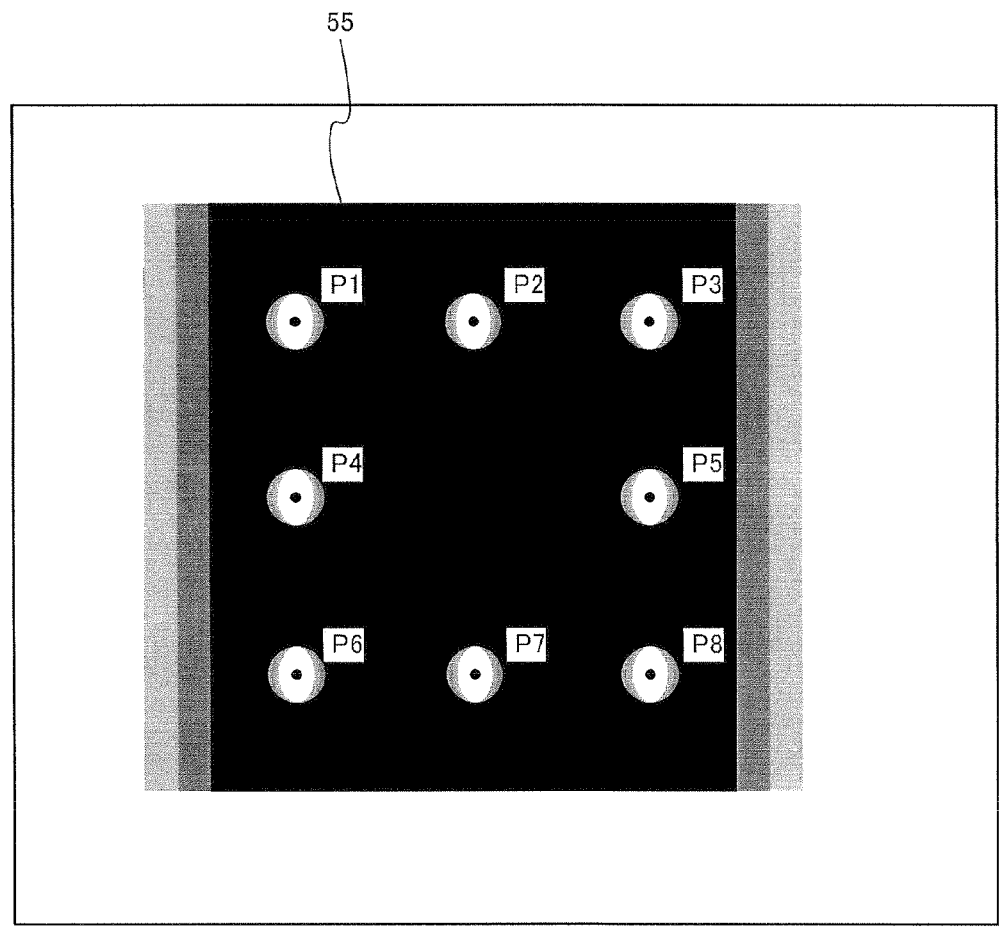
FIG. 9 is a diagram showing the center points of the inner graphic patterns in the first graphic pattern.

FIG. 9 is a diagram showing the center points of the inner graphic patterns 56 in the first graphic pattern 55. In the present embodiment, the center points P1 to P8 of the inner graphic patterns 56 are calculated. Herein, the length of the first graphic pattern 55 in the left-right direction is represented by the length from the point P1 to the point P3, for example. This length will be the same whether the white dotted line or the black dotted line shown in FIG. 8 is detected as the outline. That is, this length can be calculated accurately even if the captured image is blurred.

In the present embodiment, the game apparatus 1 identifies the positions of four points on the marker 51 from the center points P1 to P8 of the inner graphic patterns 56, as will be described later in detail. The positions of the four points are the positions of the four vertices of the rectangular shape (square) represented by the eight inner graphic patterns 56. The position and direction of the marker 51 are identified by the positions of the four points. Note however that the positions of the four points are the vertices of the square, and therefore take the same values whether the marker 51 is not rotated or rotated by 90°, 180° or 270°. Therefore, with the positions of the four points, it is not possible to identify the direction of the marker 51 with respect to the four directions (up, down, left and right), and thus it is not possible to uniquely identify the direction of the marker 51. Therefore, the game apparatus 1 uniquely identifies the direction of the marker 51 by detecting the second graphic pattern 57. Note that the method for identifying the direction of the marker 51 using the second graphic pattern 57 will be described later.

As described above, in the present embodiment, the game apparatus 1 calculates the center points 21 to P8 of the inner graphic patterns 56 in the marker detection process. Then, the position of the marker 51 is calculated by identifying the positions of the four points of the marker 51 from the center points P1 to P8. Now, since the center points P1 to P8 are calculated accurately even where the captured image is blurred, the game apparatus 1 can accurately calculate the position of the marker 51 by using the center points P1 to P8 even if the captured image is blurred.

[Details of Game Process]

Figure 10:
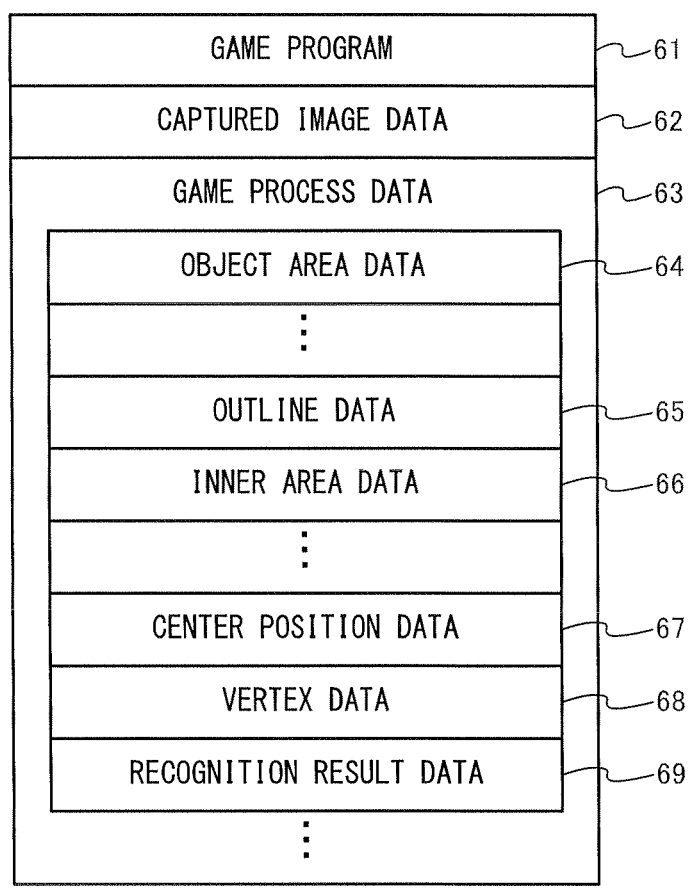
FIG. 10 is a diagram showing various data to be used in processes performed by a game program.

Next, referring to FIGS. 10 to 15, the details of the game process executed by the game program will be described. First, various data used in the game process will be described. FIG. 10 is a diagram showing various data to be used in processes performed by the game program. In FIG. 10, a game program 61, captured image data 62, and game process data 63 are stored in the main memory 32 of the game apparatus 1.

The game program 61 is a program for instructing the CPU 31 of the game apparatus 1 to execute a game process (FIG. 11) to be described later. A part or whole of the game program 61 is read out from the memory card 29 at an appropriate timing so as to be stored in the main memory 32. The game program 61 includes a program for executing the above-described image recognition process, in addition to a program for allowing the game to progress.

The captured image data 62 is data representing an image (captured image) captured by a camera (the internal camera 23 or the external camera 25). As the captured image data 62, only the latest image data obtained from the camera may be stored, or a predetermined number of latest pieces of image data may be stored.

The game process data 63 represents various data to be used in the game process. The game process data 63 includes object area data 64, outline data 65, inner area data 66, center position data 67, vertex data 68, and recognition result data 69. Note that in addition to those described above, the game process data 63 stores various data necessary for the game, such as data of various objects (e.g., the cannon 52) appearing in the game, and sound data such as BGM.

The object area data 64 is data representing the object area described above, i.e., the area of the first graphic pattern 55 in the captured image. The object area data 64 is obtained by the above-described area detection process. Note that in the present embodiment, the detection process is performed with a low precision in the area detection process, and therefore an area that is actually not the first graphic pattern 55 may be detected as an area of the first graphic pattern 55. Thus, a plurality of areas may be detected as object areas in the area detection process. In such a case, the object area data 64 for each area detected is stored in the main memory 32 (i.e., a plurality of pieces of object area data are stored). Note that the object area data 64 may be any data as long as it represents an area, and it may represent only the outline of the area or may represent every pixel of the area.

The outline data 65 is data representing the outline of the first graphic pattern 55 in the captured image. The outline data 65 is data representing an area of the first graphic pattern 55, as does the object area data 64, but the outline data 65 differs from the object area data 64 in that it is detected with a higher precision.

The inner area data 66 is data representing an area of the inner graphic pattern 56 in the first graphic pattern 55. As described above, the first graphic pattern 55 includes a plurality of (eight) inner graphic patterns 56. Therefore, if the eight inner graphic patterns 56 are detected correctly in the marker detection process, eight pieces of the inner area data 66 are stored in the main memory 32. Note however that there may be cases in practice where the eight inner graphic patterns 56 are not all detected. In such a case, a number of pieces of the inner area data 66 equal to the number of inner graphic patterns 56 detected are stored in the main memory 32. Note that the inner area data 66 may be any data as long as it represents an area, and it may represent only the outline of the area or may represent every pixel of the area.

The center position data 67 is data representing the center positions of the inner graphic patterns 56. The center position data 67 represents a number of center positions equal to the number of inner graphic patterns 56 detected in the marker detection process.

The vertex data 68 is data representing the positions of the four vertices of a rectangular shape (square) represented by the eight inner graphic patterns 56. The four vertices are calculated based on the center positions of the eight inner graphic patterns 56 as will be described later in detail.

The recognition result data 69 is data representing the position and direction of the marker 51, which is output as the result of the recognition process. The position and direction of the marker 51 are calculated based on the four vertices represented by the vertex data 68, and the direction of the second graphic pattern 57 with respect to the first graphic pattern 55 in the captured image, as will be described later in detail.

Figure 11:
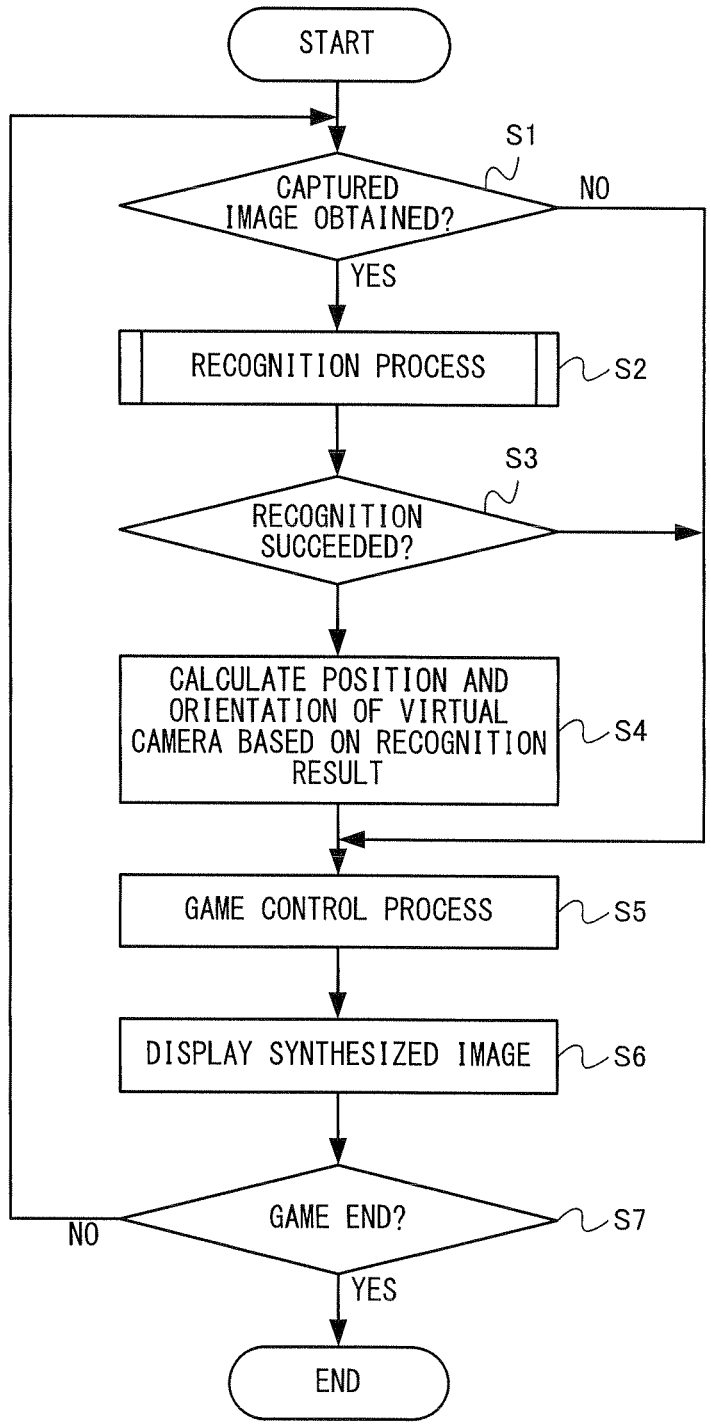
FIG. 11 is a main flow chart showing the flow of a game process executed by the game apparatus.

Next, the details of the game process executed by the game apparatus 1 will be described with reference to FIGS. 11 to 16. FIG. 11 is a main flow chart showing the flow of a game process executed by the game apparatus 1. When the power button 14F is pressed down and the power of the game apparatus 1 is turned ON, the CPU 31 of the game apparatus 1 displays a menu screen (e.g., an image including images (icons) representing various applications) used for instructing to start various applications. On the menu screen, the user instructs to start the game program 61, e.g., instructs to select the icon of the game program 61. When the start of the game program 61 is instructed on the menu screen, the CPU 31 initializes the main memory 32, etc., and starts executing the game program 61 for performing the process shown in FIG. 11. In the present embodiment, as the game program 61 is executed, the CPU 31 functions as various sections recited in the claims. That is, the game program 61 instructs the CPU 31 to function as various sections recited in the claims.

First, in step S1, the CPU 31 determines whether a captured image has been obtained. That is, it determines whether data of a captured image has been sent from a camera (the external camera 25 in the present embodiment). If data of a captured image has been sent from the camera, the CPU 31 stores the data as the captured image data 62 in the main memory 32. Note that it is assumed in the present embodiment that while the process loop through steps S1 to S7 is executed once every frame period (1/60 sec), the camera sends a captured image with a lower frequency (once every about a few frame periods). Note however that a captured image may be obtained once every frame period (or every period that is shorter than a frame period) in other embodiments. If the determination result of step S1 is affirmative, the process of step S2 is performed. On the other hand, if the determination result of step S1 is negative, the process of steps S2 to S4 is skipped, and the process of step S5 to be described below is performed.

In step S2, the CPU 31 executes a recognition process on the captured image obtained in step S1. In the recognition process, it is determined whether the image of the marker 51 is included in the captured image, and if the image of the marker 51 is included therein, the direction and position of the marker 51 in the captured image are calculated. Now, referring to FIG. 12, the details of the recognition process will be described.

Figure 12:
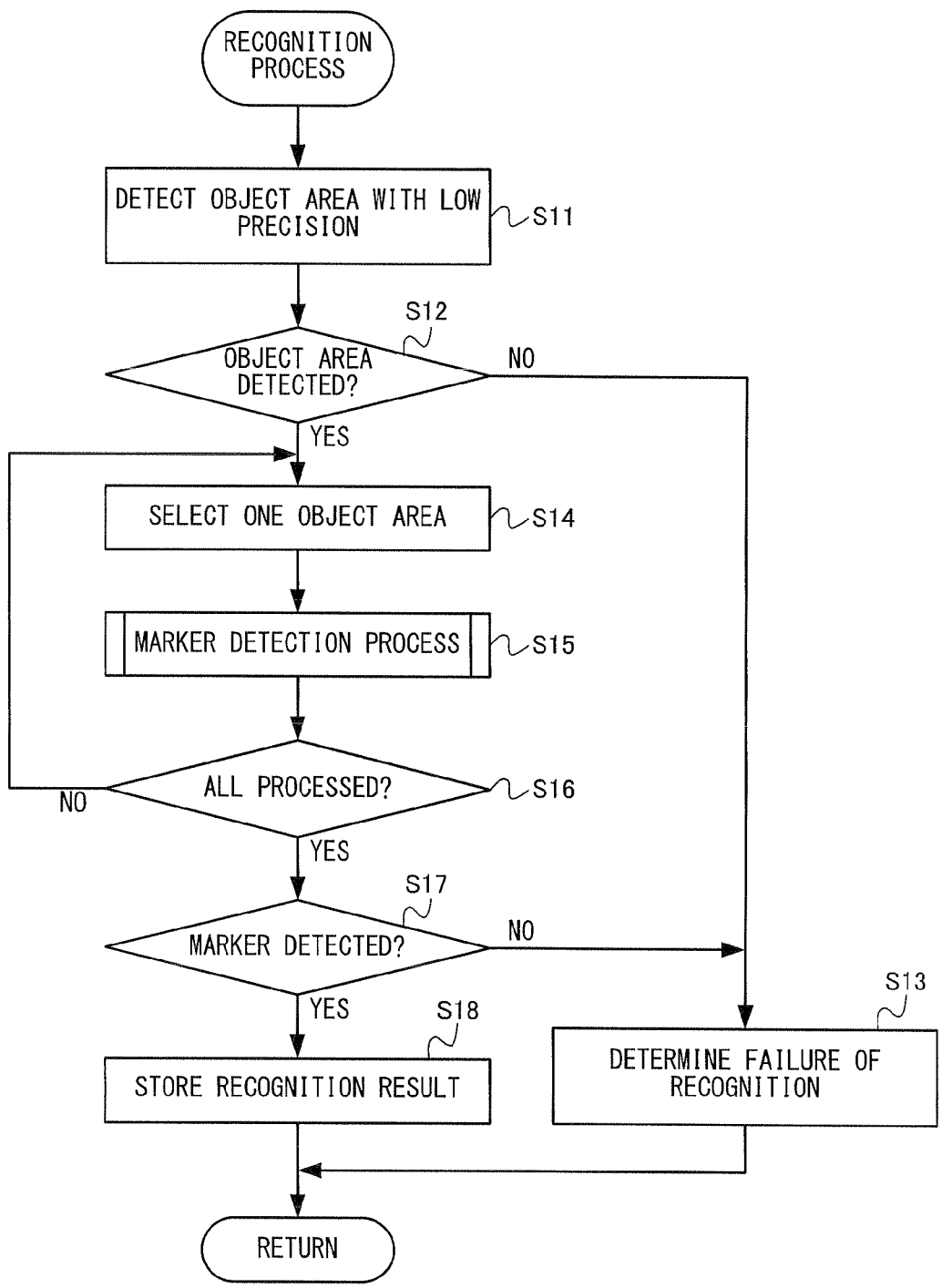
FIG. 12 is a flow chart showing the flow of a recognition process (step S2) shown in FIG. 11.
Figure 13:
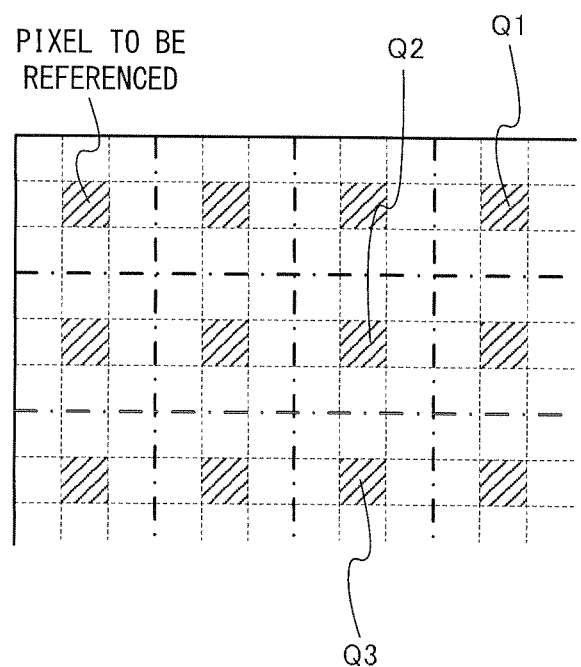
FIG. 13 is a diagram showing pixels in the captured image whose pixel values are referenced in the process of step S11.

FIG. 12 is a flow chart showing the flow of the recognition process (step S2) shown in FIG. 11. In the recognition process, first, in step S11, the CPU 31 executes the above-described area detection process, i.e., detects an area (object area) including the first graphic pattern 55. As described above, the area detection process of step S11 is performed with a low precision. Specifically, the CPU 31 detects the object area from the captured image based on pixel values obtained at a 3-pixel pitch across the captured image. More specifically, the CPU 31 reads out the captured image data 62 from the main memory 32, and extracts pixel values at a 3-pixel pitch from the pixel values of the pixels represented by the image data. Then, the object area is detected based on the extracted pixel values. FIG. 13 is a diagram showing pixels in the captured image whose pixel values are referenced in the process of step S11. In FIG. 13, hatched pixels are pixels whose pixel values are to be referenced.

In the present embodiment, the object area is detected based on the difference in pixel values (the luminance values in the present embodiment, but color values may also be used) between adjacent pixels. That is, in the present embodiment, since a white frame is formed around the black first graphic pattern 55 (see FIG. 6), it is possible to detect pixels along the outline portion of the first graphic pattern 55 by detecting pixels whose luminance values are lower than adjacent pixels by a predetermined value or more. Note that the term "adjacent pixels" means adjacent ones of pixels whose pixel values are referenced. In the example of FIG. 13, "adjacent pixels" are one hatched pixel and another pixel (also hatched) that is at a 3-pixel pitch from the first pixel. After detecting pixels along the outline portion, the CPU 31 combines adjacent ones of the detected pixels into a single collection, thus identifying a single object area. Data representing pixels forming the identified object area is stored in the main memory 32 as a piece of object area data 64 for each object area. Note that where an identified object area is too large or too small, the CPU 31 may exclude the object area so that the object area data 64 representing the object area is not stored. The process of step S12 is performed following step S11.

Note that the method for detecting the object area in step S11 may be any method. For example, in other embodiments, the CPU 31 may detect the outline of the first graphic pattern 55 by binarizing the pixel values with a predetermined threshold value, and determine, as an object area, the area within the detected outline. In other embodiments, the CPU 31 may detect the object area by a pattern matching method. That is, a pattern image of the first graphic pattern 55 may be pre-stored in the main memory 32, and an area that is identical (similar) to the pattern image is detected from within the area of the captured image so as to detect the object area. In such a case, the pattern matching process may be similar to that of a conventional augmented reality technique.

While the CPU 31 detects an area of the first graphic pattern 55 as the object area in step S11 in the present embodiment, an area of the marker 51 including the first graphic pattern 55 and the second graphic pattern 57 may be detected as the object area in other embodiments.

In the present embodiment, the object area is detected with a low precision as described above, and the object area detection process is based on the luminance difference between the first graphic pattern 55 of the marker 51 and the surrounding white frame. Therefore, if the white frame of the marker 51 is too narrow, the white frame may not appear in the captured image with a low precision, thereby failing to accurately detect the object area. Therefore, it is preferred that the white frame of the marker 51 has a sufficient thickness so that the white frame appears on the captured image even with a low precision. Note that the thickness of the white frame can be determined appropriately according to the expected range of distance from the camera to the marker 51 during the use of the game apparatus 1, the resolution of the captured image, the sizes of the marker 51, etc.

In step S12, the CPU 31 determines whether the object area has been detected in step S11. If the object area is not detected in step S11, the process of step S13 is performed. On the other hand, if one or more object areas are detected in step S11, the process of step S14 is performed.

In step S13, the CPU 31 determines that the recognition of the marker 51 has failed. That is, the CPU 31 stores data indicating the recognition failure in the main memory 32 as the recognition result data 69. After step S13, the CPU 31 exits the recognition process.

In step S14, the CPU 31 selects one of object areas detected in step S11. Note that where a plurality of object areas are detected in step S11, the process step through steps S14 to S16 is repeated. In such a case, in step S14, an object area that has not been selected in the process step is selected. The process of step S15 is performed following step S14.

Figure 14:
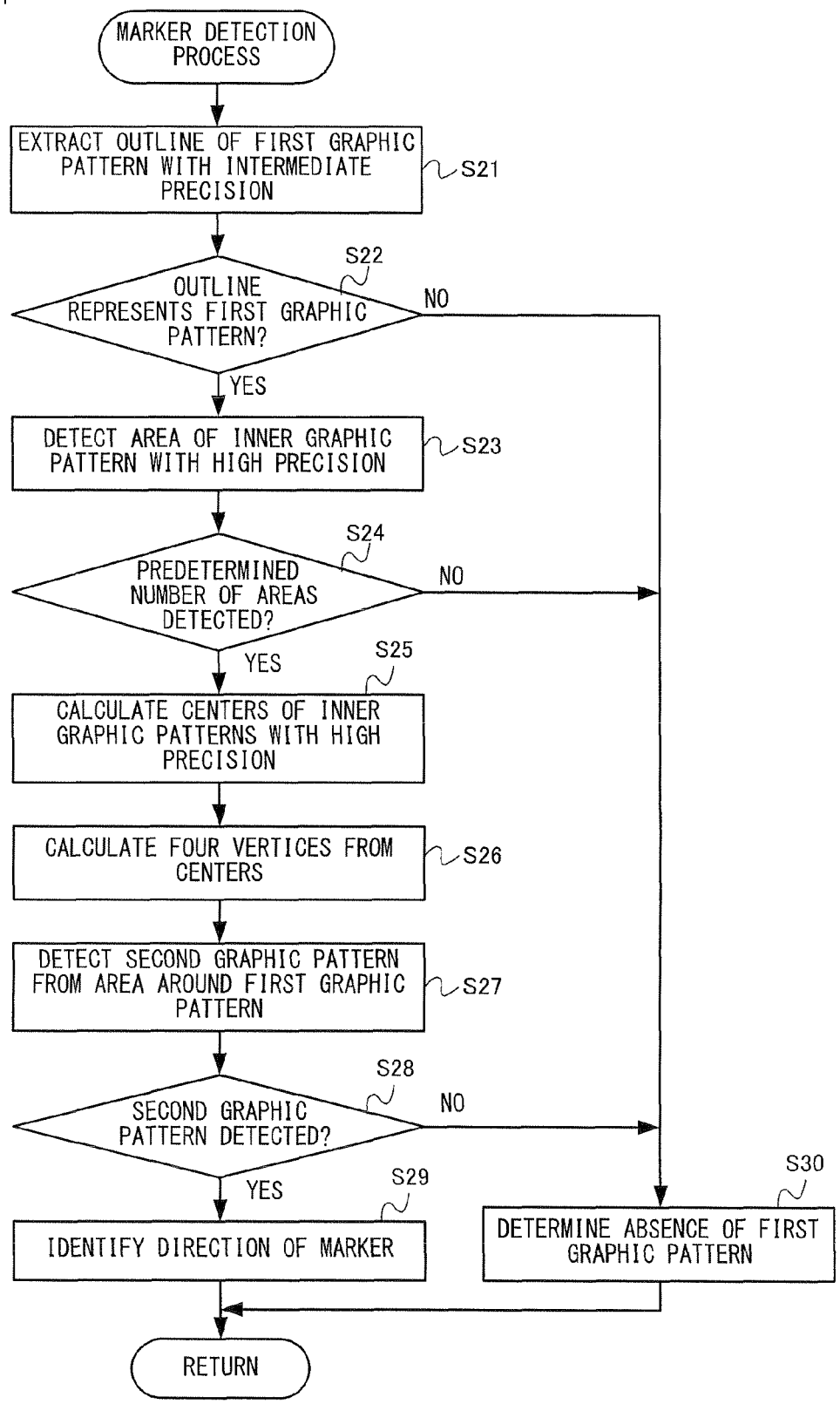
FIG. 14 is a flow chart showing the flow of a marker detection process (step S15) shown in FIG. 12.

In step S15, the CPU 31 performs the marker detection process on the object area selected in step S14. The marker detection process is a process of detecting the marker 51 from the object area, and calculating the position and direction of the marker 51. Referring now to FIG. 14, the details of the marker detection process will be described.

FIG. 14 is a flow chart showing the flow of the marker detection process (step S15) shown in FIG. 12. In the marker detection process, first, in step S21, the CPU 31 extracts the outline of the first graphic pattern 55 with an intermediate precision. Herein, the term "intermediate precision" means a precision that is higher than that used in the process of step S11, but is lower than that used in the process of steps S23 and S25 to be described later. That is, in the present embodiment, the marker detection process is performed with two levels of precision, and the process of step S21 is performed with the lower precision. The details of the process of step S21 will now be described.

While the process of step S21 is performed within the object area detected in step S11, the process of step S11 and that of step S21 are performed with different precisions.

Figure 15:
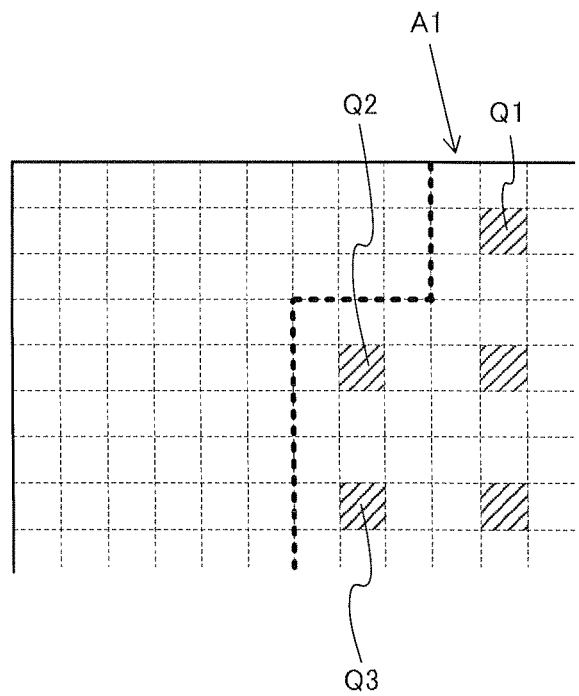
FIG. 15 is a diagram showing an example of an area to be the subject of the process of in step S21.

Therefore, in step S21, the CPU 31 first determines an area to be the subject of the process of step S21, which corresponds to the object area detected in step S11. That is, an area to be the subject of the process of step S21 is determined from pixels represented by the object area data 64 obtained in step S11. More specifically, the CPU 31 associates each pixel (each hatched pixel shown in FIG. 13) to be referenced in the low-precision process (step S11) with eight pixels surrounding the pixel (pixels delimited by a one-dot-chain line in FIG. 13). Then, an area including pixels within the object area detected in step S11 and sets of surrounding eight pixels associated therewith is determined as an area to be the subject of the process of step S21. FIG. 15 is a diagram showing an example of an area to be the subject of the process of step S21. FIG. 15 assumes a case where pixels Q1 to Q3 are detected in step S11, and an area on the right of the pixels Q1 to Q3 is detected as the object area. In such a case, the area A1 on the right of the one-dot-chain line shown in FIG. 15 is the area to be the subject of the process of step S21.

Figure 16:
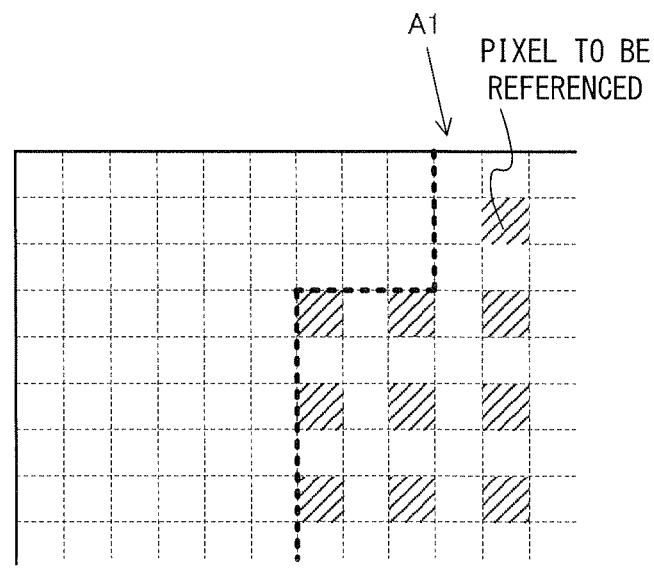
FIG. 16 is a diagram showing pixels in the captured image whose pixel values are referenced in the process of step S21.

After an area to be the subject of the process is determined, the CPU 31 extracts the outline of the first graphic pattern 55 with an intermediate precision. In the present embodiment, the outline extracting process is performed based on pixel values obtained at a 2-pixel pitch across the captured image. FIG. 16 is a diagram showing pixels in the captured image whose pixel values are referenced in the process of step S21. For example, in a case where the area A1 shown in FIG. 15 is the subject of the process of step S21, pixel values of hatched pixels shown in FIG. 16 are referenced in the outline extracting process.

Note that the outline extracting process of step S21 may be performed by a method using the luminance value difference, as is the method for detecting the object area in step S11, or may be performed by another method. Data of the pixels forming the outline extracted in step S21 is stored in the main memory 32 as the outline data 65. The process of step S22 is performed following step S21.

In step S22, the CPU 31 determines whether the outline extracted in step S21 represents the first graphic pattern 55. In the present embodiment, the CPU 31 makes the determination of step S22 based on whether the outline represents a rectangular shape. That is, the CPU 31 reads out the outline data 65 from the main memory 32, and approximates the pixels forming the outline by straight lines, thus calculating a polygon formed by the pixels. Then, it is determined whether the outline represents the first graphic pattern 55 based on whether the calculated polygon is rectangular. If the determination result of step S22 is affirmative, the process of step S23 is performed. On the other hand, if the determination result of step S22 is negative, the process of step S30 to be described later is performed.

Note that while the determination whether the extracted outline represents the first graphic pattern 55 is made based on whether the outline is rectangular in step S22, the determination may be made by another method. For example, in other embodiments, where the size of the marker 51 is known, the determination may be performed based on, for example, whether the size (e.g., the area or the circumferential length) of the extracted outline is greater than or equal to a predetermined value.

In step S23, the CPU 31 detects an area of the inner graphic pattern 56 with a high precision. Herein, the term "high precision" means a precision that is higher than those used in the process of step S11 and the process of step S21. In the present embodiment, the CPU 31 detects the area of the inner graphic pattern 56 by referencing pixel values at a 1-pixel pitch, i.e., by referencing pixel values of all pixels within an area to be the subject of the process of step S23.

Although the process of step S23 is performed across the area represented by the outline extracted in step S21, the precision is different between the process of step S21 and the process of step S23. Therefore, the area to be the subject of the process needs to be determined in step S23, as in step S21. The area to be the subject of the process may be determined by a method similar to that of step S21. That is, the CPU 31 associates each reference pixel that can be referenced in the intermediate-precision process (step S21) with three adjacent pixels (e.g., one on the right, one below, and one on lower right of the reference pixel). Then, the reference pixel included in the outline extracted in step S21 and the three pixels associated with the reference pixel are determined to be the subject of the process of step S23.

After the area to be the subject of the process is determined, the CPU 31 detects the area of the inner graphic pattern 56 with a high precision. Herein, the area of the inner graphic pattern 56 may be detected by a method which is based on the luminance value difference, as is the method for detecting the object area in step S11, or may be detected by another method. Note that where a method based on the luminance value difference is used, the CPU 31 preferably detects a pixel whose luminance value is higher than that of an adjacent pixel by a predetermined value or more since the inner graphic pattern 56 to be detected in step S23 is white with the surrounding area being black. In the present embodiment, the CPU 31 detects (a plurality of) pixels representing the outline of the inner graphic pattern 56 as information representing the area of the inner graphic pattern 56. Data of pixels representing the area of the inner graphic pattern 56 detected in step S23 is stored in the main memory 32 as the inner area data 66. Where a plurality of inner graphic patterns 56 are detected in step S23, one piece of inner area data 66 is stored in the main memory 32 for each inner graphic pattern. The process of step S24 is performed following step S23 described above.

Note that in other embodiments, the CPU 31 may set a condition regarding the shape and/or size of the detected area so as to exclude areas that do not satisfy the condition in step S23. That is, the CPU 31 may not store the inner area data 66 for those of areas detected based on the luminance difference whose shape is not circular or whose size is not within a predetermined range.

In step S24, the CPU 31 determines whether a predetermined number of areas have been detected in step S23. Herein, the predetermined number is the number of inner graphic patterns 56 drawn within the first graphic pattern 55, i.e., eight. Specifically, the CPU 31 determines whether the number of pieces of the inner area data 66 stored in the main memory 32 is eight. If the determination result of step S24 is affirmative, the process of step S25 is performed. On the other hand, if the determination result of step S24 is negative, the process of step S30 to be described later is performed.

In step S25, the CPU 31 calculates the center position of the inner graphic pattern 56 with a high precision. The center position of the inner graphic pattern 56 is calculated based on the area detected in step S23, i.e., based on the pixels representing the outline of the inner graphic pattern 56. The specific method for calculating the center position may be any method, and the center position can be obtained by calculating the average value among the position coordinates of the pixels representing the outline of the inner graphic pattern 56, for example. In the present embodiment, the CPU 31 reads out the inner area data 66 from the main memory 32, and calculates the average value among the pixels represented by the inner area data 66. Note that eight pieces of the inner area data 66 are stored, and the process of calculating the average value is performed for each piece of data. The data representing the eight average values calculated is stored in the main memory 32 as the center position data 67. The process of step S26 is performed following step S25.

Figure 17:
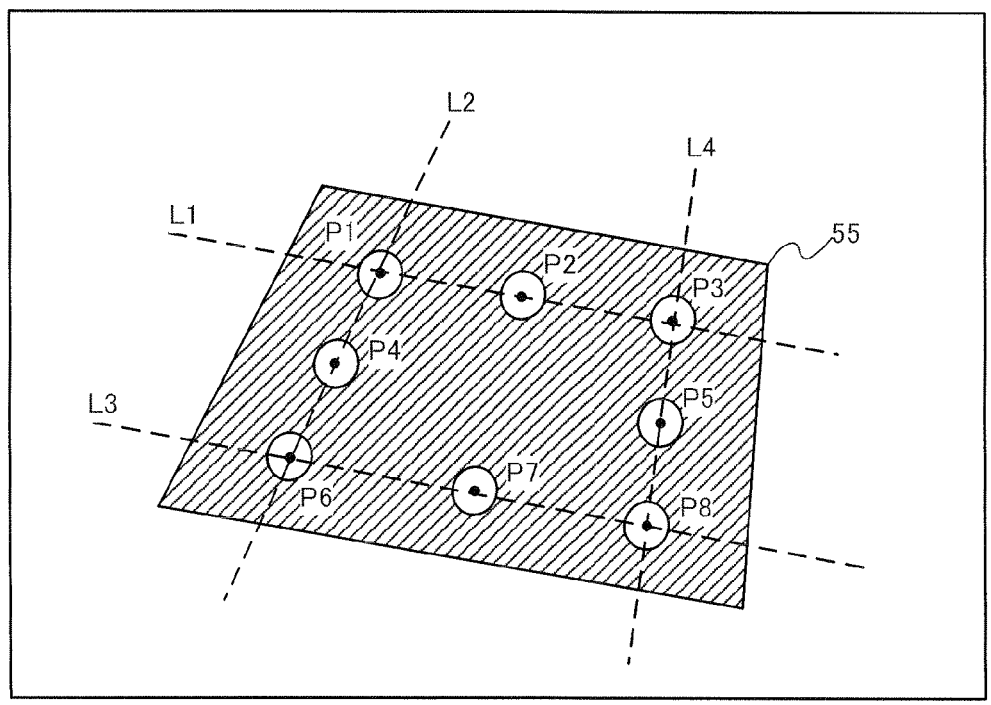
FIG. 17 is a diagram showing an example of a captured image representing a first graphic pattern.
Figure 18:
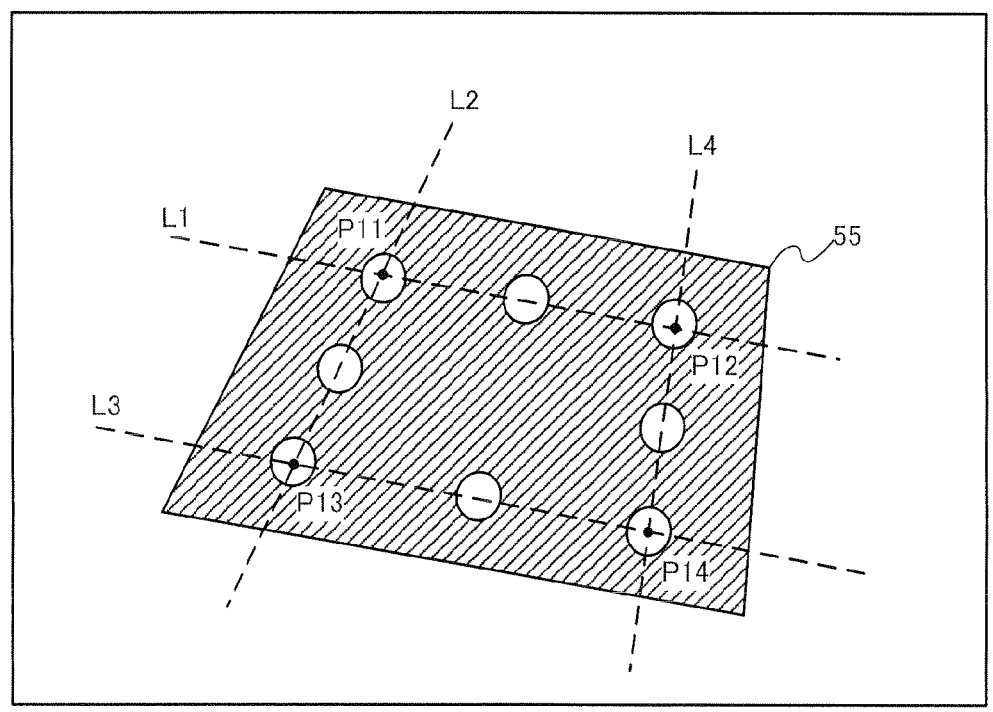
FIG. 18 is a diagram showing four vertices P11 to P14 calculated from straight lines L1 to L4 shown in FIG. 17.

In step S26, the CPU 31 calculates the positions of the four vertices representing the position of the marker 51 based on the center positions calculated in step S25. Herein, the four vertices are the vertices of a rectangular shape of which the vertices and the middle points of the sides are represented by the eight inner graphic patterns 56. Referring now to FIGS. 17 and 18, a method for calculating the four vertices will be described.

FIG. 17 is a diagram showing an example of a captured image representing a first graphic pattern. In FIG. 17, the points P1 to P8 are points representing the positions calculated in step S26 as the center positions of the eight inner graphic patterns 56. In step S26, the CPU 31 first calculates four straight lines L1 to L4 passing through three of the eight center positions. Specifically, the CPU 31 calculates the straight line L1 passing through the points P1 to P3, the straight line L2 passing through the points P1, P4 and P6, the straight line L3 passing through the points P6 to P8, and the straight line L4 passing through the points P3, P5 and P8. The straight lines L1 to L4 can each be calculated as an approximate straight line passing through three points by using the least squares method, etc.

FIG. 18 is a diagram showing four vertices P11 to P14 calculated from the straight lines L1 to L4 shown in FIG. 17. After the straight lines L1 to L4 are calculated, the CPU 31 calculates the vertices P11 to P14 of the rectangular shape formed by the straight lines L1 to L4. That is, the CPU 31 calculates the intersection P11 between the straight line L1 and the straight line L2, the intersection P12 between the straight line L1 and the straight line L4, the intersection P13 between the straight line L2 and the straight line L3, and the intersection P14 between the straight line L3 and the straight line L4. Thus, the four vertices P11 to P14 can be calculated. Data representing the calculated positions of the four vertices is stored in the main memory 32 as the vertex data 68. The process of step S27 is performed following step S26.

Calculating the four vertices in step S26 means that positions of four points in the marker 51 have been calculated. Now, the position and direction of the marker 51 can be calculated based on the positions of the four points in the marker 51. Note however that the positions of the four points are the vertices of the square, and therefore take the same values whether the marker 51 is not rotated or rotated by 90°, 180° or 270°. Therefore, with the positions of the four points, it is not possible to identify the direction of the marker 51 with respect to the four directions (up, down, left and right), and thus it is not possible to uniquely identify the direction of the marker 51. Therefore, the CPU 31 uniquely identifies the direction of the marker 51 by identifying the direction of the marker 51 with respect to the four directions (up, down, left and right) through the process of steps S27 to S29 to be described below. Note that the CPU 31 may omit the process of steps S27 to S29 to be described below and use the positions of the four points as the recognition results if the direction from which an image of the marker 51 is to be captured is predetermined (known) among the four directions (up, down, left and right), or if the direction of the marker 51 with respect to the four directions (up, down, left and right) is irrelevant (i.e., if it is considered the same whether the marker 51 is not rotated or rotated by 90°, 180° or 270°).

In step S27, the CPU 31 detects the second graphic pattern 57 from an area around the first graphic pattern 55. In the present embodiment, the CPU 31 detects the second graphic pattern 57 from one of the four predetermined areas located next to a rectangular shape formed by the four vertices calculated in step S26 in the four directions (up, down, left and right). Since the second graphic pattern 57 is located next to the first graphic pattern 55 (see FIG. 6), and the position of the first graphic pattern 55 is identified by the four vertices, the second graphic pattern 57 can be detected by performing a detection process for the four predetermined areas.

Figure 19:
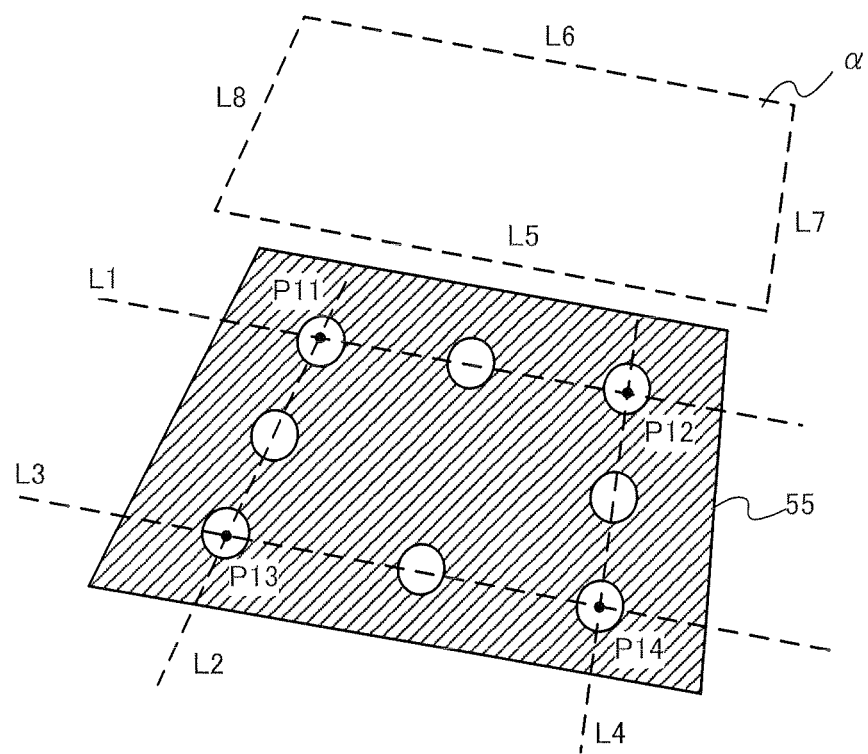
FIG. 19 is a diagram showing an example of a predetermined area set in step S27.

FIG. 19 is a diagram showing an example of a predetermined area set in step S27. In FIG. 19, an area α delimited by the straight lines L5 to L8 is the predetermined area. The predetermined area α is set along the side P11-P12 among the four sides of the rectangular shape formed by the four vertices P11 to P14. The straight lines 15 to L8 are the lower side, the upper side, the right side and the left side, respectively, of the predetermined area α where the upper side is the side of the rectangular shape formed by the four vertices P11 to P14 on which the predetermined area α is located. The straight lines L5 to 18, which are the four sides of the predetermined area α, can be set as follows, for example. The straight line L5, which is the lower side, is set parallel to the straight line L1 and apart from the straight line L1 by a predetermined first distance in a direction perpendicular to the straight line L1. The straight line L6, which is the upper side, is set parallel to the straight line L1 and apart from the straight line L1 by a predetermined second distance (greater than the first distance) in a direction perpendicular to the straight line L1. The straight line L7, which is the right side, is set parallel to the straight line L4, which is the right side of the rectangular shape formed by the vertices P11 to P14, and apart from the straight line L4 by a predetermined third distance in a direction of the straight line L1. The straight line L8, which is the left side, is set parallel to the straight line L2, which is the left side of the rectangular shape formed by the vertices P11 to P14, and apart from the straight line L2 by a predetermined fourth distance in the direction of the straight line L1. The predetermined area α can be calculated as described above. The other three predetermined areas can be calculated as is the predetermined area α.

While the method for detecting the second graphic pattern 57 from one of the four predetermined areas may be any method, the second graphic pattern 57 is detected by a pattern matching method in the present embodiment. That is, a pattern image of the second graphic pattern 57 is pre-stored in the main memory 32, and the CPU 31 detects an area that is identical (similar) to the pattern image from the predetermined areas, thus detecting the second graphic pattern 57. The process of detecting the second graphic pattern 57 may be performed with any precision. Note that since this process can be performed with the limited areas, i.e., the predetermined areas, it does not need to be performed with a high precision.

As a specific process of step S27, the CPU 31 first reads out the vertex data 68 from the main memory 32, and identifies the four predetermined areas based on the four vertices. Next, the pattern image of the second graphic pattern 57 is read out from the main memory 32, and a portion that is identical to the pattern image is detected from the four predetermined areas identified. The process of step S28 is performed following step S27.

In step S28, the CPU 31 determines whether the second graphic pattern 57 has been detected in step S27. That is, it is determined whether there is an area, among the four predetermined areas, where the second graphic pattern 57 has been detected. If the determination result of step S28 is affirmative, the process of step S29 is performed. On the other hand, if the determination result of step S28 is negative, the process of step S30 to be described later is performed.

In step S29, the CPU 31 identifies the direction of the marker 51 (with respect to the four directions (up, down, left and right)). Now, once the direction of the predetermined area where the second graphic pattern 57 has been detected as viewed from the rectangular shape formed by four vertices (the direction of the predetermined area as viewed from the rectangular shape) is known, it means that the direction in which the second graphic pattern 57 is located with respect to the first graphic pattern 55 in the captured image is known, and it is therefore possible to identify the direction of the marker 51. That is, in step S29, the direction of the marker 51 is identified based on the direction in which the second graphic pattern 57 is located with respect to the first graphic pattern 55 in the captured image.

Note that in the present embodiment, the position and direction of the marker 51 are represented by two vectors V1 and V2 connecting together the four vertices. Specifically, the vector V1 is a vector whose start point is the upper left vertex and whose end point is the upper right vertex where it is assumed that the upper direction is the direction in which the second graphic pattern 57 is located with respect to the first graphic pattern 55. The vector V2 is a vector whose start point is the lower left vertex and whose end point is the lower right vertex, under the above settings. Where the vectors V1 and V2 are assumed as described above, if the predetermined area where the second graphic pattern 57 has been detected is located along the straight line L1 shown in FIG. 19, for example, the straight line L1 shown in FIG. 19 is the upper side of the rectangular shape formed by four vertices. Therefore, in such a case, the vector V1 is calculated as a vector whose start point is the point P11 and whose end point is the point P12, and the vector V2 is calculated as a vector whose start point is the point P13 and whose end point is the point P14. The position and direction of the marker 51 can be represented by these vectors V1 and V2.

In step S29, the CPU 31 calculates the vectors V1 and V2 by using the four vertices so that they extend in a direction according the direction of the predetermined area where the second graphic pattern 57 has been detected with respect to the rectangular shape formed by four vertices. Data representing the calculated vectors V1 and V2 is stored in the main memory 32. After step S29 described above, the CPU 31 exits the marker detection process.

On the other hand, in step S30, the CPU 31 determines that the first graphic pattern 55 is absent in the object area which is the subject of the current marker detection process. In such a case, the various data 65 to 68 calculated in steps S21 to S28 of the current marker detection process are deleted from the main memory 32. After step S30, the CPU 31 exits the marker detection process.

In the marker detection process, the CPU 31 detects a plurality of inner graphic patterns from the image of the object area (step S23) and calculates the center positions of the inner graphic patterns, thereby detecting the marker 51 (steps S25 and S26). Thus, because the center positions of the inner graphic patterns are used, the position of the marker 51 can be calculated accurately even if the captured image is blurred.

By the series of processes of steps S21 to S23, the outline of the first graphic pattern 55 is extracted from within the object area (step S21), and it is determined whether the extracted outline represents the first graphic pattern 55 (step S22). Then, if the extracted outline represents the first graphic pattern 55, a plurality of inner graphic patterns 56 are detected from within the area corresponding to the outline (step S23). That is, the inner graphic patterns 56 are detected from within the area corresponding to the outline that is determined to be representing the first graphic pattern 55. Thus, object areas that do not include the first graphic pattern 55 can be excluded before the process of detecting the inner graphic patterns 56, and it is therefore possible to prevent the process of detecting the inner graphic patterns 56 from being performed wastefully, and to efficiently perform the recognition process. Moreover, in the present embodiment, the outline extracting process can be performed more quickly than the process of detecting the inner graphic pattern 56, and the game apparatus 1 can therefore perform the recognition process in a shorter period of time.

By the series of processes of steps S23 to S25, areas of a plurality of inner graphic patterns 56 are detected in the object area (step S23) and it is determined whether the number of areas detected is equal to a predetermined number (step S24). If the number of areas detected is equal to the predetermined number, the center positions of the areas are calculated (step S25). That is, the center positions of the inner graphic patterns 56 are calculated for the object area where a predetermined number of areas have been detected. Thus, object areas that do not include the first graphic pattern 55 can be excluded before the process of calculating the center positions of the inner graphic patterns 56, and it is therefore possible to prevent the process of calculating the center positions from being performed wastefully, and to efficiently perform the recognition process.

In the marker detection process, the precision of the process of detecting the inner graphic patterns 56 (step S23) is equal to the precision of the process of calculating the center positions of the inner graphic patterns 56 (step S25). In other embodiments, the CPU 31 may perform the process of detecting the inner graphic patterns 56 with a lower precision than that of the process of calculating the center positions of the inner graphic patterns 56. That is, the pixel pitch at which pixel values are obtained in the process of detecting the inner graphic patterns 56 may be set to be larger than that at which pixel values are obtained in the center position calculating process. Then, the process of detecting the inner graphic patterns 56 can be performed more quickly, and the recognition process can be performed more quickly. Note that the process of detecting the inner graphic patterns 56 may be performed with the same precision as that of the process of extracting the outline of the first graphic pattern 55 (step S21), or may be performed with a higher precision than that of the extracting process.

Referring back to FIG. 12, the process of step S16 is performed following the marker detection process of step S15. In step S16, the CPU 31 determines whether the marker detection process has been performed for all object areas detected in step S11. If the determination result of step S16 is affirmative, the process of step S17 is performed. On the other hand, if the determination result of step S16 is negative, the process of step S14 is executed again. Thereafter, the process of steps S14 to S16 is repeated until it is determined in step S16 that the marker detection process has been performed for all object areas. Thus, the marker detection process is performed for each object area detected in step S11.

In step S17, the CPU 31 determines whether the marker 51 has been detected in the marker detection process of step S15. Specifically, the CPU 31 determines whether the marker 51 has been detected based on whether the recognition result data 69 is stored in the main memory 32. If the determination result of step S17 is affirmative, the process of step S18 is performed. On the other hand, if the determination result of step S17 is negative, the process of step S13 is executed again. That is, if the determination result of step S17 is negative, it is determined that the recognition of the marker 51 has failed, and the process exits the recognition process.

In step S18, the CPU 31 stores information representing the position and direction of the marker 51 obtained in the marker detection process of step S15 as the recognition result. That is, data representing the vectors V1 and V2 calculated in step S29 of the marker detection process is stored in the main memory 32 as the recognition result data 69. After step S18, the CPU 31 exits the recognition process.

Note that in the marker detection process, the vectors V1 and V2 may be calculated for each of a plurality of object areas detected in step S11 from one captured image. That is, a plurality of sets of the vectors V1 and V2 may be stored in the main memory 32 in a single recognition process. In such a case, one of the sets represents the correct marker 51, and the others are resulting from erroneous detection. Therefore, in such a case, the CPU 31 may select the vectors V1 and V2 which represent the correct marker 51 based on the shape, the arrangement, etc., of the graphic patterns (the first graphic pattern 55, the inner graphic pattern 56 and the second graphic pattern 57) obtained in the marker detection process. For example, it is possible to select the correct vectors V1 and V2 based on the outline of the first graphic pattern 55 extracted in step S21, the arrangement of the inner graphic patterns 56 detected in step S23, the degree of similarity between the second graphic pattern 57 detected in step S27 and the pattern image, etc. The CPU 31 stores data representing the selected vectors V1 and V2 in the main memory as the recognition result data 69. Thus, even if a plurality of sets of the vectors V1 and V2 are obtained (by erroneous detection) in the recognition process, it is possible to obtain correct recognition results. Note that in other embodiments, if a plurality of sets of the vectors V1 and V2 are obtained in a single recognition process, the CPU 31 may determine that the recognition has failed.

In the recognition process described above, an object area is detected (step S11) based on pixel values obtained at a first pitch (3-pixel pitch) across the captured image. Then, the first graphic pattern 55 is detected from the image of the object area based on pixel values obtained at a second pitch (1-pixel or 2-pixel pitch) which is smaller than the first pitch across the object area of the captured image. Thus, it is possible to perform the recognition process quickly by performing the process of detecting the object area in a short period of time. Since the process of detecting the first graphic pattern 55 is performed with a high precision, it is possible to detect the first graphic pattern 55 accurately with a high precision. That is, with the recognition process described above, the process of detecting the first graphic pattern 55 from the captured image can be performed quickly and precisely.

Note that it is assumed in the present embodiment that the recognition process of step S2 is performed in a frame period, and the recognition process is completed within the process loop through steps S1 to S7. Depending on the resolution of the captured image or the capacity of the CPU 31, etc., it may be difficult for a single recognition process to be completed within a frame period. Therefore, in other embodiments, the recognition process does not have to be performed with the same cycle as a process such as the display process (step S5) which is performed with a cycle of a frame period. That is, only a portion of the recognition process may be performed in a single iteration of step S2. In such a case, the amount of process to be performed in each iteration of step S2 is adjusted so that the series of processes of steps S1 to S7 can be completed within a frame period. In other words, the recognition process may be performed separately from, and in parallel to, the process loop through steps S1 to S7 (excluding S2), and may be performed while the CPU 31 is idling.

Referring back to FIG. 11, the process of step S3 is performed following the recognition process of step S2. In step S3, the CPU 31 determines whether the recognition process of step S2 has succeeded. The determination of step S3 can be made based on whether the recognition result data 69 stored in the main memory 32 represents the position and direction of the marker 51. If the determination result of step S3 is affirmative, the process of step S4 is performed. On the other hand, if the determination result of step S3 is negative, the process of step S4 is skipped and the process of step S5 to be described later is performed.

In step S4, the CPU 31 calculates the position and orientation of a virtual camera based on the recognition results of step S2. The virtual camera is a camera assumed in the virtual space for determining the point of view, the viewing direction and the viewing angle for producing an image of the virtual space. In step S4, the CPU 31 first calculates the positional relationship between the game apparatus 1 (camera) and the marker 51 based on the position and direction of the marker 51 which are the recognition results of step S2. The positional relationship is represented as the three-dimensional position and orientation of one of the game apparatus 1 and the marker 51 with respect to the other, for example. Next, the CPU 31 calculates the position and orientation of the virtual camera in the virtual space based on the positional relationship. The position and orientation of the virtual camera are calculated so that the positional relationship between the virtual camera in the virtual space and the position corresponding to the marker 51 in the virtual space is equal to the positional relationship between the game apparatus 1 and the marker 51 in the real space. Note that the process of step S4 may be a method similar to a process used in a conventional augmented reality technique as described in, for example, Non-Patent Document 1 identified above. If the recognition process of step S2 has failed, the CPU 31 does not calculate the position and orientation of the virtual camera, but uses the position and orientation of the virtual camera which were calculated when the recognition process succeeded last. The process of step S5 is performed following step S4.

In step S5, the CPU 31 performs a game control process. The game control process is a process for allowing the game to progress by, for example, moving an object around in the virtual space according to, for example, an input from a user (player). Specifically, the game control process includes the process of controlling the action of the player character according to the user input, and the process of controlling the action of the object (e.g., the cannon 52 shown in FIG. 4) according to control rules prescribed in the game program 61. The CPU 31 may use, as game inputs, the recognition result data 69 as well as operations on various input devices (the touch panel 13 and the operation buttons 14A to 14L) provided on the game apparatus 1. For example, the position of the virtual camera calculated from the recognition result data 69 may be used as the position of the player character. The process of step S6 is performed following step S5.

In step S6, the CPU 31 produces a synthesized image by synthesizing together the captured image and the image (virtual image) of the virtual object in the virtual space, and displays the synthesized image on a display apparatus (the upper LCD 22). That is, the CPU 31 first produces a virtual image based on the position and orientation of the virtual camera set in step S4. Thus, there is produced an image of the virtual object as viewed from the position of the virtual camera. Next, the CPU 31 produces and displays a synthesized image by synthesizing the produced image of the virtual object with the captured image. Note that the captured image used for producing the synthesized image may be the latest captured image obtained or the latest captured image for which the recognition process has succeeded. Note that the synthesized image producing process may be a process similar to that of a conventional augmented reality technique. The process of step S7 is performed following step S6.

In step S7, the CPU 31 determines whether the game should be ended. The determination of step S7 is made based on, for example, whether the game has been cleared, the game has been over, the player has given an instruction to quit the game, etc. If the determination result of step S7 is negative, the process of step S1 is executed again. The process loop through steps S1 to S7 is repeated until it is determined in step S7 that the game should be ended. On the other hand, if the determination result of step S7 is affirmative, the CPU 31 ends the game process shown in FIG. 11. The game process is as described above.

With the game process described above, it is possible to perform the recognition process quickly and precisely by changing the process precision between the object detection process (step S11) of detecting the area of the first graphic pattern 55 from the captured image, and the marker detection process (step S15) of detecting the marker 51 including the first graphic pattern 55 from the detected area. By calculating the center positions of the inner graphic patterns 56 in the first graphic pattern 55 and calculating the positions (four vertices) on the marker 51 based on the center positions, it is possible to accurately calculate the position of the marker 51 even if the captured image is blurred.

Note that by the series of processes of steps S3 to S6, if the marker 51 is detected (Yes in step S3), the positional relationship between the marker 51 and the external camera 25 is calculated based on the process result of the recognition process (the detection result for the marker 51) (step S4). Then, the virtual image representing the virtual object placed in the virtual space is produced based on the positional relationship, and an image obtained by synthesizing the virtual image with the captured image is displayed on the display apparatus (step S5). Therefore, in the present embodiment, the recognition process described above can be used in a so-called "augmented reality technique". Herein, if an augmented reality technique is used as described in the present embodiment, it is preferred that the position and direction of the marker 51 are calculated accurately in the recognition process. In a game process such as one of the present embodiment, it is preferred that the recognition process is performed quickly as it is undesirable if a process delay deteriorates the response speed to game operations or delays the game progress. Therefore, the recognition process of the present embodiment, which can be performed quickly and precisely, is particularly effective in a game process using an augmented reality technique.

[Variations]

The above embodiment is an example of how the present invention can be carried out, and the present invention may be carried out as described below, for example, in other embodiments.

(Variation Using Another Recognition Method)

The above embodiment uses a recognition method in which the first graphic pattern 55 including the inner graphic patterns 56 is the image object, and the first graphic pattern 55 is detected by calculating the center positions of the inner graphic patterns 56. Herein, the method for recognizing the image object is not limited to the method for calculating the center position of the inner graphic pattern 56 described above, but may be another method. As a variation using another recognition method, a variation using a recognition method using a pattern matching method will now be described.

Figure 20:
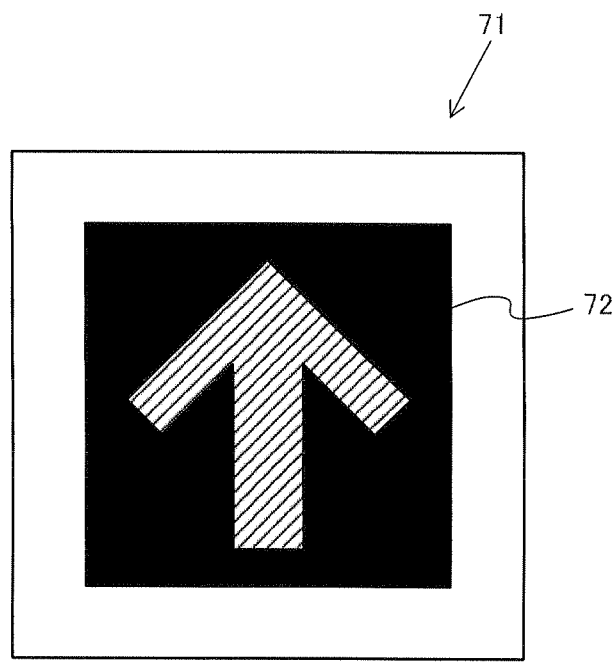
FIG. 20 is a diagram showing a marker used in a variation of the present embodiment.

FIG. 20 is a diagram showing a marker used in a variation of the present embodiment. In this variation, a marker 71 shown in FIG. 20 is used instead of the marker 51 shown in FIG. 6. The marker 71 does not include a plurality of inner graphic patterns, and includes a third graphic pattern 72 with a predetermined graphic pattern (an arrow in FIG. 20) drawn therein. In this variation, the third graphic pattern 72 is the object to be recognized (detected) in the recognition process. Note that while the predetermined graphic pattern may be any graphic pattern, it is preferably such a graphic pattern that does not stay in the same shape when rotated by a predetermined angle so that the direction of the marker 71 can be identified.

Figure 21:
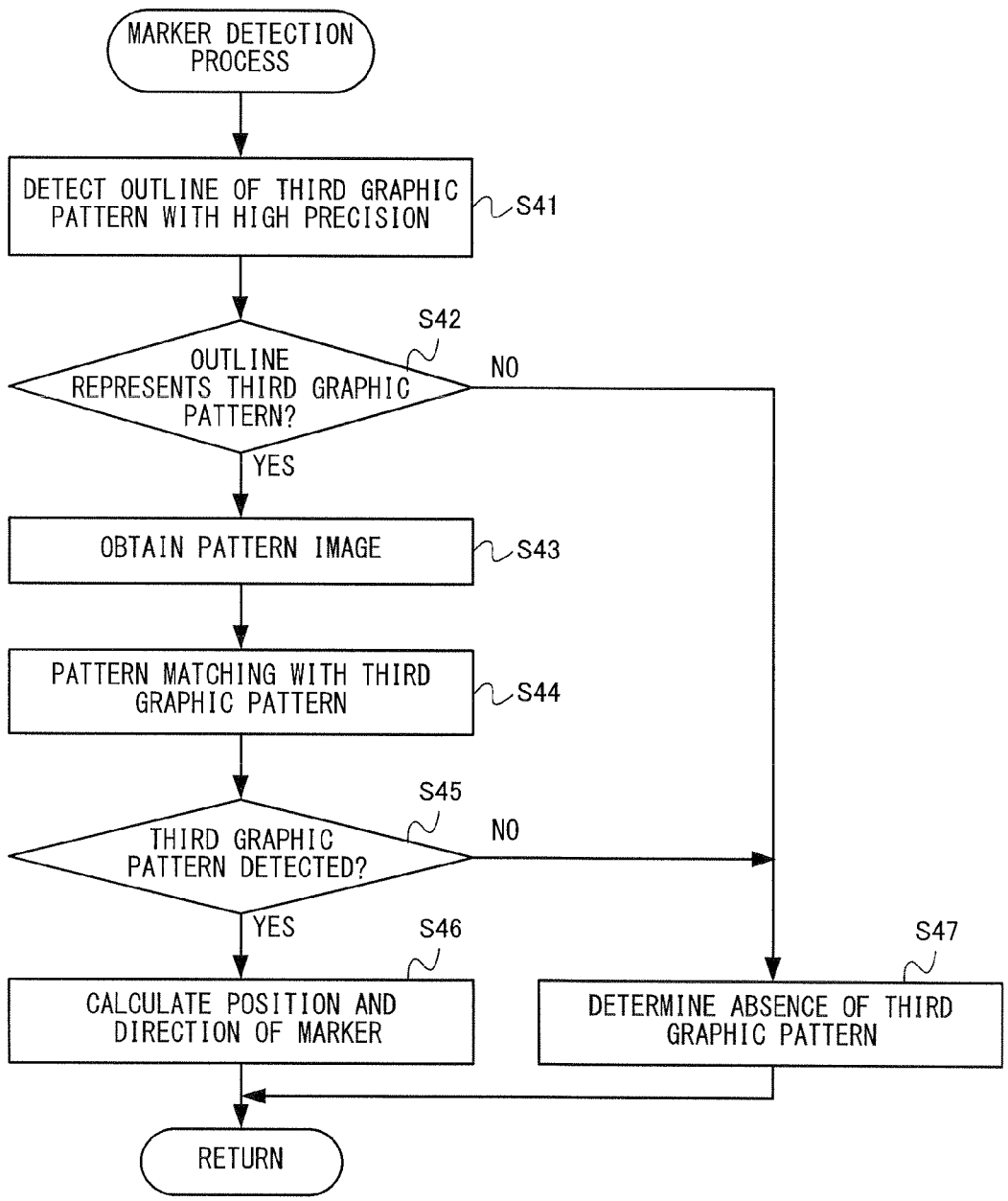
FIG. 21 is a flow chart showing the flow of a marker detection process in a variation of the present embodiment.

FIG. 21 is a flow chart showing the flow of a marker detection process in a variation of the present embodiment. Note that the recognition process in this variation is the same as that shown in FIG. 12 except for the marker detection process. Therefore, the area detection process (step S11) is performed with a low precision also in this variation.

In the marker detection process of this variation, first, in step S41, the CPU 31 extracts the outline of the third graphic pattern 72 of the marker 71 with a high precision. That is, the CPU 31 extracts the outline of the third graphic pattern 72 by referencing pixel values at a 1-pixel pitch across the object area. Note that the outline extracting method is similar to that of step S21. Data of the pixels forming the extracted outline is stored in the main memory 32. The process of step S42 is performed following step S41.

In step S42, the CPU 31 determines whether the outline extracted in step S21 represents the marker. The determination of step S42 can be made by the same method as the determination process of step S22 described above although the precision of the outline is different from that of the determination process of step S22. If the determination result of step S42 is affirmative, the process of step S43 is performed. On the other hand, if the determination result of step S42 is negative, the process of step S47 to be described later is performed.

In step S43, the CPU 31 reads out the pattern image representing the third graphic pattern 72 from the main memory 32. Note that there may be a single pattern image representing the third graphic pattern 72, or there may be a total of four different pattern images including one pattern image and three other versions thereof rotated by 90°, 180° and 270°. The process of step S44 is performed following step S43.

In step S44, the CPU 31 performs pattern matching for the third graphic pattern 72 across the object area. That is, an area that is identical (similar) to the pattern image read out in step S43 is detected from within the object area. Note that the pattern matching in step S44 may be performed with any precision, and it does not have to be performed with a high precision. The process of step S45 is performed following step S44.

In step S45, the CPU 31 determines whether the third graphic pattern 72 has been detected in the object area by the pattern matching in step S44. If the determination result of step S45 is affirmative, the process of step S46 is performed. On the other hand, if the determination result of step S45 is negative, the process of step S47 is performed.

In step S46, the CPU 31 identifies the position and direction of the marker 71 based on the result of the pattern matching in step S44. That is, the CPU 31 calculates the positions of the four vertices based on the outline of the third graphic pattern 72 extracted in step S41, and calculates the direction of the third graphic pattern 72 with respect to the four directions (up, down, left and right) based on the direction of the pattern image when it matched the captured image. Moreover, the process calculates the vectors V1 and V2 described above for the third graphic pattern 72 based on the calculated positions of the four vertices and the direction of the third graphic pattern 72 with respect to the four directions. Thus, it is possible to identify the position and direction of the marker 71. After step S46 described above, the CPU 31 exits the marker detection process.

On the other hand, in step S47, the CPU 31 determines that no marker is present in the object area which is the subject of the current marker detection process. The process of step S47 is the same as that of step S40 described above. After step S47 described above, the CPU 31 exits the marker detection process.

As described above, in this variation, it is possible in the marker detection process shown in FIG. 21 to calculate the position of the marker 71 (the third graphic pattern 72) with a high precision through the process of steps S41 and S46. As in the above embodiment, the area detection process (step S11) is performed with a low precision, and the marker detection process is performed only for the object area. Therefore, as in the above embodiment, it is possible to perform the recognition process in a short period of time. Therefore, also in this variation, it is possible to perform the recognition process quickly and precisely, as in the above embodiment.

The recognition process may be any process in which the object (the first graphic pattern 55) is detected by a low-precision area detection process and a high-precision marker detection process, and there is no limitation on the specific detection methods for these two processes. For example, the game apparatus 1 may use a pattern matching method for detection both in the two processes. That is, in the area detection process, the game apparatus 1 detects, from the captured image, an object area that is identical (similar) to the pattern image by performing pattern matching based on pixel values obtained at a 3-pixel pitch. Then, the marker detection process determines whether the first graphic pattern 55 is present within the object area by performing pattern matching based on pixel values obtained at a 1-pixel pitch across the detected object area. Also in this manner, the game apparatus 1 can perform the recognition process quickly and precisely as in the above embodiment.

(Variation Regarding Method for Calculating Four Vertices from Center Positions)

In step S24, the CPU 31 determines whether the number of areas of the inner graphic patterns 56 detected in step S23 is a predetermined number. Herein, in the present embodiment, the four vertices are identified by calculating four straight lines from the center positions of the eight inner graphic patterns 56, and it is therefore possible to calculate the four vertices even if the eight inner graphic patterns 56 have not all been detected. For example, the four straight lines L1 to L4 can be calculated even if one of the center points P1 to P8 is missing in FIG. 17. Therefore, in other embodiments, the CPU 31 may determine in step S24 whether the number of areas of the inner graphic patterns 56 detected in step S23 is within a predetermined range. Herein, the predetermined range is a range including the number of inner graphic patterns (eight), and is, for example, a range from seven to eight.

Note that in the above embodiment, when calculating four straight lines from seven center positions, it is necessary to identify one straight line from two center positions. In this case, it is necessary to avoid a situation where an invalid straight line is calculated from an invalid set of two center positions (e.g., a case where a straight line passing through the center point P3 and the center point P4 is calculated). Therefore, the CPU 31 may calculate the four straight lines from seven center positions so as to satisfy the following conditions, for example.

Condition 1: To pass through two or three of the seven center positions.

Condition 2: To lie generally parallel to one of four straight lines that represent the outline of the first graphic pattern 55.

Condition 3: To lie within a predetermined distance from one of four straight lines that represent the outline of the first graphic pattern 55 (to not pass near the center of the first graphic pattern 55).

Note that in Conditions 2 and 3, the four straight lines that represent the outline of the first graphic pattern 55 may be those calculated in step S22. By calculating straight lines each satisfying Conditions 1 to 3, it is possible to calculate four straight lines from seven center positions.

As described above, the image object may be the first graphic pattern 55 including three or more inner graphic patterns arranged along a single straight line, and an approximate straight line may be calculated from the center positions of two or more inner graphic patterns so as to calculate the position of the marker 51 (the positions of the four vertices) based on the approximate straight line. Then, there is provided redundancy in the number of inner graphic patterns, whereby it is possible to calculate the positions of the four vertices even if the inner graphic patterns cannot all be detected.

(Variation Regarding Marker)

Figure 22:
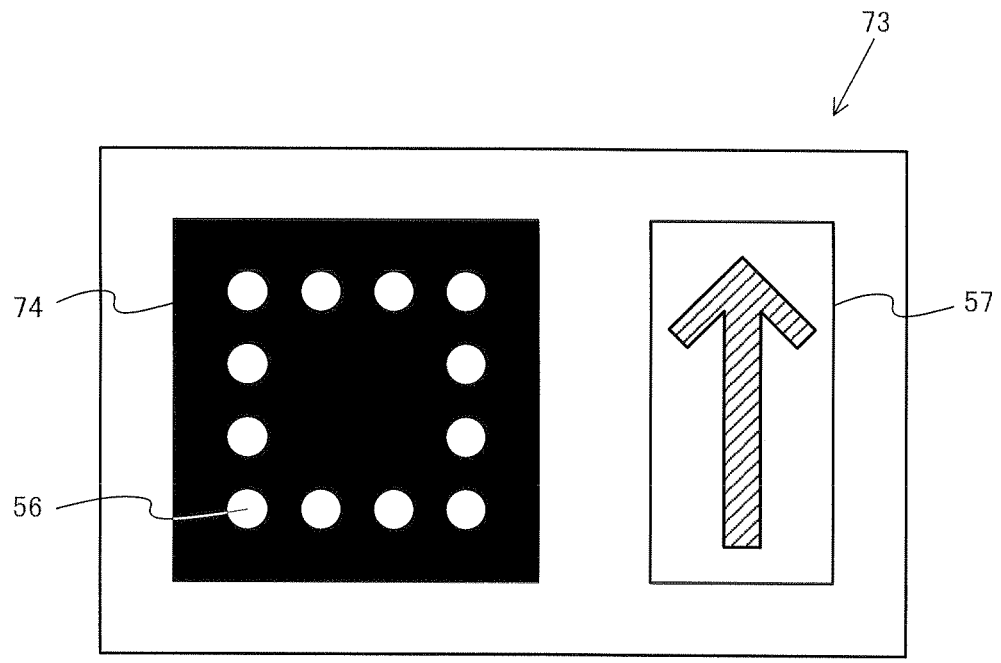
FIG. 22 is a diagram showing a marker of a variation of the present embodiment.

While the above embodiment is directed to an example where the marker 51 including the first graphic pattern 55 with the eight inner graphic patterns 56 drawn therein is used, the marker that can be used in the present invention is not limited to this. For example, in other embodiments, the number of the inner graphic patterns 56 is not limited to eight. FIG. 22 is a diagram showing a marker of a variation of the present embodiment. A marker 73 shown in FIG. 22 includes a first graphic pattern 74 with twelve inner graphic patterns 56 therein, and a second graphic pattern 57 similar to that of FIG. 6. The twelve inner graphic patterns 56 in the first graphic pattern 74 are arranged at the four vertices and along the four sides of the rectangular shape (square). In other embodiments, the marker 73 shown in FIG. 22 may be used instead of the marker 51 shown in FIG. 6. In a case where the marker 73 is used, the CPU 31 may calculate the straight lines L1 to L4 from three or four center positions in step S26 described above. Then, there is provided redundancy in the number of inner graphic patterns, whereby the CPU 31 can calculate the positions of the four vertices even if the inner graphic patterns cannot all be detected.

Figure 23:
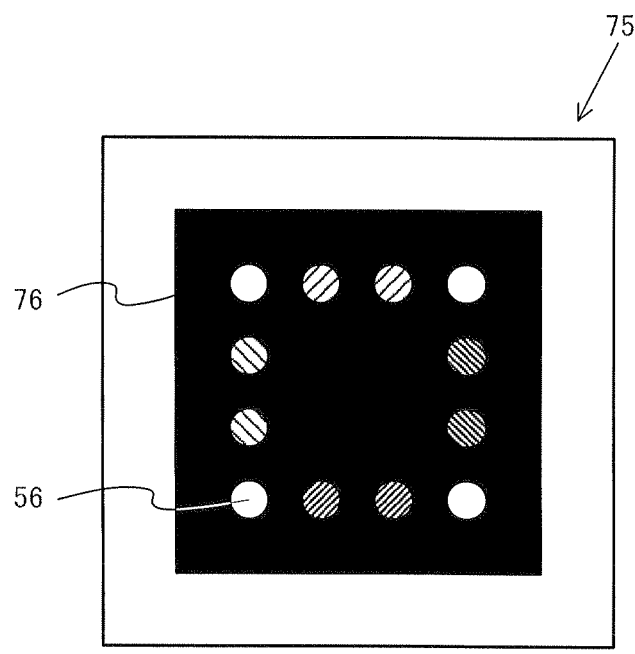
FIG. 23 is a diagram showing a marker of another variation of the present embodiment.

While it is assumed in the above embodiment that the inner graphic patterns 56 are all of the same color (white), the colors of the inner graphic patterns 56 may differ from one another depending on the position within the first graphic pattern 55 in other embodiments. FIG. 23 is a diagram showing a marker of another variation of the present embodiment. A marker 75 shown in FIG. 23 includes a first graphic pattern 76 with twelve inner graphic patterns 56 drawn therein, as does the first graphic pattern 74 shown in FIG. 22. Herein, in the first graphic pattern 76, the colors of the inner graphic patterns 56 arranged along the four sides of the rectangular shape (square) are different from one another for each side (directions and density of hatching represent different colors in FIG. 23). In other embodiments, the marker 75 shown in FIG. 23 may be used instead of the marker 51 shown in FIG. 6. In such a case, the CPU 31 may calculate the direction of the marker 75 (the direction with respect to the four directions (up, down, left and right)) without using the second graphic pattern. That is, the CPU 31 can identify the direction with respect to the four directions (up, down, left and right) of the marker 75 by detecting the color of the inner graphic patterns 56.

In the above embodiment, the marker 51 is provided with a white frame around the black first graphic pattern 55 for the purpose of making it easier to detect the first graphic pattern 55. Therefore, the object to be detected in the recognition process is the first graphic pattern 55 inside the marker 51. In other embodiments, there may be no white frame, and the object to be detected in the recognition process may be the entire marker 51.

In the above embodiment, the marker 51 includes the second graphic pattern 57 at a position different from the first graphic pattern 55. The CPU 31 identifies the direction (the direction with respect to the four directions (up, down, left and right)) of the first graphic pattern 55 based on the direction in which the second graphic pattern 57 is located with respect to the first graphic pattern 55 (S29). In other embodiments, a marker including second graphic patterns drawn inside a first graphic pattern may be used. For example, in the marker 51 shown in FIG. 6, the second graphic pattern 57 may be formed inside a rectangular shape represented by the eight inner graphic patterns 56 inside the first graphic pattern 55. Note that the second graphic pattern may be any graphic pattern as long as the direction thereof can be identified, such as the arrow-shaped graphic pattern of the above embodiment. Then, the CPU 31 detects the second graphic pattern from the area inside the rectangular shape formed by the four vertices, after calculating the four vertices in step S26. Then, the direction of the first graphic pattern with respect to the four directions (up, down, left and right) is identified based on the direction of the second graphic pattern detected. Also with this method, as with the above embodiment, it is possible to identify the direction of the first graphic pattern with respect to the four directions (up, down, left and right). Note however that when a marker with the second graphic pattern drawn inside the first graphic pattern is used, the inside graphic patterns and the second graphic pattern are both included inside the first graphic pattern. Therefore, there is an increased possibility of erroneous detection when detecting the inside graphic patterns (as compared with that of the above embodiment), and the precision of the recognition process may possibly decrease. In other words, since the above embodiment uses a marker only with the inside graphic patterns inside the first graphic pattern, it is possible to more accurately detect the inside graphic patterns and to improve the precision of the recognition process.

While the marker 51 is a thin plate-like member with a predetermined graphic pattern drawn thereon in the above embodiment, the marker 51 may be implemented by displaying a predetermined graphic pattern on a display apparatus in other embodiments. For example, in other embodiments, another portable game apparatus with the marker 51 displayed on its screen may be used as the marker 51.

(Variation Regarding Captured Image Used in Recognition Process)

In the above embodiment, the same captured image is used with the low-precision area detection process (step S11), and the high-precision marker detection process (step S15). In other embodiments, images of different resolutions may be used in the two processes. Specifically, the area detection process may use an image with a resolution lower than the captured image used in the marker detection process. For example, where the game apparatus 1 produces a low-resolution image from an image captured by the camera because, for example, such an image is needed in a process other than the recognition process, the low-resolution image may be used in the area detection process.

(Variation Regarding Calculation of Marker Position)

In the above embodiment, the CPU 31 calculates the center positions of the inner graphic patterns 56, and calculates the position of the marker 51 (the positions of the four vertices P11 to P14) in the captured image based on the center positions. In other embodiments, the CPU 31 may use the center positions of the inner graphic patterns 56 directly as the position of the marker 51. For example, the CPU 31 may use the points P1, P3, P6 and P8 shown in FIGS. 9 and 17 as the position of the marker 51. While positions of four points (the positions of the four vertices P11 to P14) are used as information representing the position and direction of the marker 51 in the above embodiment, the position and direction of the marker 51 can be identified when positions of three or more points of the marker 51 are known. Therefore, in other embodiments, positions of three or five or more points may be used as information representing the position and direction of the marker 51. Therefore, the CPU 31 can detect the position and direction of the marker 51 based on the center positions of three or more inner graphic patterns.

(Other Variations)

In the above embodiment, the game apparatus 1 executes the recognition process on an image that is captured in real time by the external camera 25 of the game apparatus 1. In other embodiments, the captured image used in the recognition process may be an image that has been captured in the past or a captured image that the game apparatus 1 obtains from an external device. While the external camera 25 is built in the game apparatus 1 in the above embodiment, an external camera that can be attached to the game apparatus 1 may be used instead of the external camera 25 in other embodiments.

The above embodiment is directed to a case where a recognition process is used in an augmented reality technique. The object to be recognized in the recognition process is a marker used in an augmented reality technique. The present invention is applicable to any image recognition process of recognizing any image object from a captured image. For example, in other embodiments, the recognition process may be used in an application where the face of a user is recognized from a captured image, followed by a predetermined process performed on the recognized face (e.g., adding thereon scribbles, etc.).

While the recognition process is performed by only one information processing apparatus (the game apparatus 1) in the above embodiment, the recognition process may be allotted to a plurality of information processing apparatuses in an image recognition system having a plurality of information processing apparatuses that can communicate with each other in other embodiments.

As described above, the present invention can be used as a game program or a game apparatus, for example, for the purpose of, for example, shortening the amount of time required for detection while maintaining the object detection precision.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein an image recognition program to be executed by a computer of an information processing apparatus for detecting a predetermined image object included in a captured image captured by an imager, the image recognition program instructing the computer to execute:

obtaining the captured image captured by the imager;

detecting an object area of the captured image that includes the predetermined image object based on pixel values obtained at a first precision across the captured image, the predetermined image object including a graphic pattern with a plurality of inner graphic patterns drawn therein;

if the detection of the object area has succeeded, detecting the plurality of inner graphic patterns included in the predetermined image object that is present within the detected object area of the captured image based on pixel values obtained at a second precision that is higher than the first precision across the detected object area of the captured image, where the pixel values are obtained at the second precision by using the detected object area; and if the detection of the object area has failed, detection of the predetermined image object is not performed at the second precision, wherein the detected object area is a portion of the captured image that is smaller than the captured image and includes the predetermined image object.

2. The storage medium according to claim 1, wherein the image recognition program further instructing the computer to execute calculating, as part of detection of the predetermined image object by the second precision pixel values a position of the predetermined image object within the captured image based on the pixel values obtained at the second precision.

3. The storage medium according to claim 1, wherein:
the image recognition program further comprises instructions that cause the computer to execute:
calculating a center position of each inner graphic pattern based on the pixel values obtained at the second precision, thereby detecting the position of the predetermined image object.

4. The storage medium according to claim 3, wherein:
the image recognition program instructs the computer to further execute extracting an outline of the predetermined image object in the detected object area,
detecting the plurality of inner graphic patterns from an area within the extracted outline.

5. The storage medium according to claim 4, wherein the outline of the predetermined image object is extracted based on pixel values obtained at a third precision higher than the first precision and lower than the second precision across the captured image.

6. The storage medium according to claim 4, wherein:
the image recognition program instructs the computer to execute determining whether the extracted outline represents the predetermined image object; and
the plurality of inner graphic patterns are detected from within an area corresponding to an outline that is determined to represent the predetermined image object.

7. The storage medium according to claim 3, wherein, as part of detecting the predetermined image object by using the second precision pixel values:
a plurality of inner graphic patterns are detected in the object area; and
center positions of at least some of the detected plurality of inner graphic patterns are calculated.

8. The storage medium according to claim 7, wherein the plurality of inner graphic patterns are detected based on pixel values obtained at a fourth precision higher than the first precision and lower than the second precision across the captured image.

9. The storage medium according to claim 7, wherein image recognition program further instructing the computer to execute:
determining whether the detected number of areas is a number within a predetermined range; and
center positions of the areas detected are calculated for the object area where a number of areas, within the predetermined range, have been detected.

10. The storage medium according to claim 1, wherein the object area is detected by extracting an outline of the predetermined image object based on pixel values of pixels adjacent to one another at the first precision.

11. The storage medium according to claim 1, wherein:
the object area is detected based on pixel values of pixels arranged at the first precision among all pixels of the captured image; and
the predetermined image object is detected based on pixel values of pixels arranged at the second precision among all pixels of the captured image.

12. The storage medium according to claim 1, wherein:
the image recognition program instructs the computer to further execute obtaining a pattern image representing the predetermined image object from a memory device that can be accessed by the information processing apparatus; and
whether the predetermined image object is included in the object area is determined by comparing an image of the object area with the pattern image.

13. The storage medium according to claim 1, wherein an outline of the predetermined image object is extracted from an image of the object area based on the pixel values obtained at the second precision, and a position of the predetermined image object is calculated in the captured image based on the extracted outline.

14. The storage medium according to claim 1, wherein the image recognition program instructs the computer to further execute:
calculating a positional relationship between the predetermined image object and the imager based on the detection results when the predetermined image object is detected;
producing a virtual image representing a virtual object placed in a virtual space based on the positional relationship; and
displaying, on a display screen, an image obtained by synthesizing the virtual image with the captured image.

15. The medium of claim 1, wherein detection of the predetermined image object is further based on:
detecting the plurality of inner graphic patterns from within the detected object area;
calculating a center position of each one of the plurality of inner graphic patterns; and
determining a position of the predetermined image object within the captured image based on the calculated center positions of each one of the plurality of inner graphic patterns.

16. The medium of claim 1, wherein the image recognition program instructs the computer to further execute extracting an outline of the predetermined image object in the detected object area,
wherein the outline of the predetermined image object is extracted based on pixel values obtained at a third precision higher than the first precision and lower than the second precision across the captured image.

17. The medium of claim 1, wherein only pixel values that are within the detected object area are used to detect the predetermined image object.

18. The medium of claim 1, wherein the predetermined image object is detected without using portions of the captured image that are outside of the detected object area.

19. An image recognition apparatus for detecting an image object, the image recognition apparatus comprising:
   a processing system including at least one processor, the processing system configured to:
      receive a captured image;
      perform a first detection process to detect an object area of the captured image that includes the image object based on pixel values obtained at a first pitch across the captured image, the object area of the captured image being smaller than the captured image that includes the image object, the image object including a graphic pattern with a plurality of inner graphic patterns drawn therein;
      responsive to successfully detecting the object area, perform a second detection process to detect the plurality of inner graphic patterns included in the graphic pattern of the image object that is within the detected object area of the captured image based on pixel values obtained at a second pitch smaller than the first pitch across the object area of the captured image, where the pixel values at the second pitch are obtained by using the detected object area; and
      as a result of failing to detect the object area, detection of the image object based on the pixel values obtained at the second pitch is not performed.

20. An image recognition system for detecting an image object, the image recognition system comprising:
   a camera configured to capture an image that includes an image object;
   a processing system that includes at least one processor coupled to a memory, the processing system configured to:
      receive the captured image;
      obtain pixel values at a first pitch across the captured image;
      perform a first process to detect an object area of the captured image that includes the image object based on the obtained pixel values at the first pitch, the object area of the captured image being smaller than the captured image that includes the image object, the image object including a graphic pattern with a plurality of inner graphic patterns drawn therein;
      in response to successful determination of the object area in the performed first process, perform a second process to detect the plurality of inner graphic patterns included in the image object that is located within the detected object area of the captured image, detection of the image object in the second process based on pixel values obtained in accordance with the detected object area and at a second pitch that is smaller than the first pitch across the detected object area of the captured image; and
      as a result of failing to detect the object area, detection of the image object is not performed at the second pitch.

21. An image recognition method for detecting an image object included in a captured image, the image recognition method comprising:
   obtaining a captured image captured by an imager;
   detecting, via at least one computer processor, an object area of the captured image based on pixel values obtained at a first pitch across the captured image, the object area encompassing the image object, the image object including a graphic pattern with a plurality of inner graphic patterns drawn therein;
   if the object area of the captured image is successfully detected, detecting, via at least one computer processor, the plurality of inner graphic patterns included in the image object that is present within the detected object area based on pixel values obtained at a second pitch smaller than the first pitch across the object area of the captured image, where the pixel values obtained at the second pitch are obtained based on the object area that is detected; and
   if the object area of the captured image is not successfully detected, detection of the image object based on the pixel values obtained at the second pitch is not performed,
   wherein the detected object area is smaller than the captured image that includes the image object.

22. A method of recognizing an object within an image, the method comprising:
   receiving a captured image that includes at least a first object that is to be detected, the first object including a graphic pattern with a plurality of inner graphic patterns drawn therein;
   selecting a first plurality of pixel values of the captured image at a first precision;
   performing, via at least one computer processor, a first process to detect an object area of the captured image based on the first plurality of pixel values, the object area of the captured image being smaller than the captured image and encompassing the first object;
   responsive to successful detection of the object area by the first process, selecting a second plurality of pixel values from within the detected object area of the captured image at a second precision, the second precision having more precision than the first precision, where the second plurality of pixel values are selected as a function of the detected object area;
   performing a second process to detect, via at least one computer processor, the plurality of inner graphic patterns included in the first object from the detected object area based on the selected second plurality of pixel values; and
   as a result of failing to detect the object area, detection of the first image object based on the second plurality of pixel values is not performed.

23. The method of claim 22, wherein the object area is associated with additional pixels that are not part of the first object.

* * * * *